United States Patent
Voellmy et al.

(10) Patent No.: US 10,361,918 B2
(45) Date of Patent: Jul. 23, 2019

(54) MANAGING NETWORK FORWARDING CONFIGURATIONS USING ALGORITHMIC POLICIES

(71) Applicant: Yale University, New Haven, CT (US)

(72) Inventors: Andreas R. Voellmy, New Haven, CT (US); Yang Richard Yang, New Haven, CT (US)

(73) Assignee: Yale University, New Haven, CT (US)

( * ) Notice: Subject to any disclaimer, the term of this patent is extended or adjusted under 35 U.S.C. 154(b) by 354 days.

(21) Appl. No.: 14/776,982

(22) PCT Filed: Mar. 19, 2014

(86) PCT No.: PCT/US2014/031249
§ 371 (c)(1),
(2) Date: Sep. 15, 2015

(87) PCT Pub. No.: WO2014/153421
PCT Pub. Date: Sep. 25, 2014

(65) Prior Publication Data
US 2016/0050117 A1  Feb. 18, 2016

Related U.S. Application Data

(60) Provisional application No. 61/803,378, filed on Mar. 19, 2013, provisional application No. 61/853,056, filed on Mar. 27, 2013.

(51) Int. Cl.
*H04L 12/24* (2006.01)
*H04L 12/64* (2006.01)
(Continued)

(52) U.S. Cl.
CPC ...... *H04L 41/0893* (2013.01); *H04L 12/6418* (2013.01); *H04L 45/48* (2013.01); *H04L 45/74* (2013.01)

(58) Field of Classification Search
CPC .................................................. H04L 41/0893
See application file for complete search history.

(56) References Cited

U.S. PATENT DOCUMENTS 8,619,793 B2 * 12/2013 Lavian ................ H04L 47/2433
370/252
2002/0021701 A1   2/2002 Lavian et al.
(Continued)

OTHER PUBLICATIONS

International Search Report and Written Opinion dated Sep. 22, 2014 from corresponding International Application No. PCT/US2014/031249.
(Continued)

*Primary Examiner* — Jason E Mattis
(74) *Attorney, Agent, or Firm* — Wolf, Greenfield & Sacks, P.C.

(57) ABSTRACT

Techniques for managing forwarding configurations in a data communications network include accessing, at least one controller, a packet-processing policy defined by a user in a general-purpose programming language other than a programming language of data forwarding element forwarding rules, the packet-processing policy specifying how data packets are to be processed through the data communications network via the at least one controller. A forwarding configuration for at least one data forwarding element in the data communications network may be derived from the user-defined packet-processing policy, and may be applied to the at least one data forwarding element.

16 Claims, 15 Drawing Sheets

(51) Int. Cl.
*H04L 12/753* (2013.01)
*H04L 12/741* (2013.01)

(56) References Cited

U.S. PATENT DOCUMENTS

| | | | | |
|---|---|---|---|---|
| 2006/0277601 | A1* | 12/2006 | Gouda | H04L 63/0263 726/11 |
| 2008/0080438 | A1* | 4/2008 | Gopalakrishnan | H04L 41/082 370/338 |
| 2009/0063382 | A1* | 3/2009 | Proctor | G06N 5/025 706/47 |
| 2009/0141719 | A1 | 6/2009 | Roy et al. | |
| 2012/0078994 | A1 | 3/2012 | Jackowski et al. | |
| 2012/0300615 | A1* | 11/2012 | Kempf | H04W 24/02 370/216 |
| 2013/0166774 | A1* | 6/2013 | Pruthi | H04L 41/5025 709/240 |
| 2014/0098678 | A1* | 4/2014 | Lumezanu | H04L 43/0876 370/248 |
| 2014/0269715 | A1* | 9/2014 | Chao | H04L 45/7457 370/392 |
| 2014/0331280 | A1* | 11/2014 | Porras | H04L 63/20 726/1 |
| 2015/0304216 | A1* | 10/2015 | Suzuki | H04L 45/16 370/390 |

OTHER PUBLICATIONS

Invitation to Pay Additional Fees dated Aug. 18, 2014 for Application No. PCT/US2014/031249.
International Preliminary Report on Patentability dated Oct. 1, 2015 for Application No. PCT/US2014/031249.
[No Author Listed], Floodlight. Project Floodlight. 2015. http://floodlight.openflowhub.org [last accessed Mar. 17, 2015]. 2 pages.
[No Author Listed], Oflops. OpenFlow. 2011. http://www.openflow.org/wk/index.php/Oflops [last accessed Mar. 19, 2016]. 3 pages.
[No Author Listed], OpenFlow 1.0 Switch Specification. Version 1.0.0. Dec. 31, 2009.42 pages.
Curtis et al., DevoFlow: Scaling Flow Management for High-Performance Networks. Proceedings of the ACM SIGCOMM 2011 Conference, Toronto, Ontario, Canada. Aug. 15-19, 2011;254-65. 12 pages.
Erickson, What is Beacon? OpenFlow. Feb. 4, 2013. https://openflow.stanford.edu/display/Beacon/Home [last accessed Jun. 3, 2016]. 2 pages.
Foster et al., Frenetic: A Network Programming Language. Proceedings of the 16th ACM SIGPLAN ICFP, Tokya, Japan. Sep. 19-21, 2011;279-91. 13 pages.
Gude et al., NOX: Towards an Operating System for Networks. ACM SIGCOMM Comput Commun Rev. Jul. 2008;38(3):105-10.
Knuth, Semantics of Context-Free Languages. Math Sys Theory. Jun. 2, 1968(2):127-45.
Mckeown et al., OpenFlow: Enabling Innovation in Campus Networks. ACM SIGCOMM Comput Commun Rev. Apr. 2008;38(2):69-74.
Monsanto et al., A Compiler and Run-Time System for Network Programming Languages. Proc POPL 2012, Philadelphia, PA. Jan. 25-27, 2012;217-30. 14 pages.
Paakki, Attribute Grammar Paradigms—A High-Level Methodology in Language Implementation. ACM Comput Surv. Jun. 1995;27(2):196-255.
Pagiamtzis et al., Content-Addressable Memory (CAM) Circuits and Architectures: A Tutorial and Survey. IEEE J Solid-State Circ. Mar. 2006;41(3):712-27.
Rotsos et al., OFLOPS: An Open Framework for OpenFlow Switch Evaluation. Proceedings of the 13th International Conference on Passive and Active Measurement. 2012;85-95. 10 pages.
Shah et al., Fast Updating Algorithms for TCAMs. IEEE Micro. Jan. 2001;21(1):36-47.

* cited by examiner

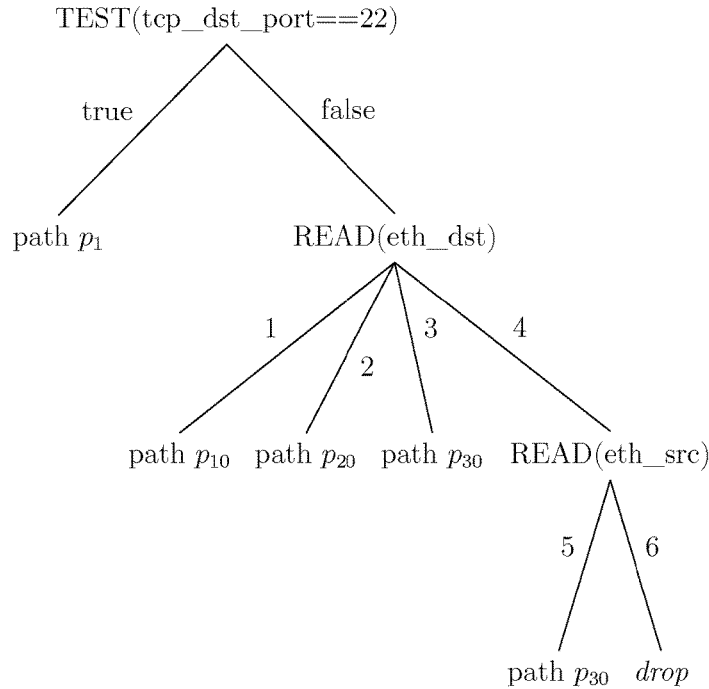

Algorithm 1: searchTT($t, p$)

1 while *true* do
2     if $type_t = \Omega$ then
3         return NIL
4     else if $type_t = \mathbf{L}$ then
5         return $value_t$
6     else if $type_t = \mathbf{T} \wedge p.attr_t = value_t$ then
7         $t \leftarrow t_+$
8     else if $type_t = \mathbf{T} \wedge p.attr_t \neq value_t$ then
9         $t \leftarrow t_-$
10    else if $type_t = \mathbf{V} \wedge p.attr_t \in dom(subtree_t)$ then
11        $t \leftarrow subtree_t[p.attr_t]$
12    else if $type_t = \mathbf{V} \wedge p.attr_t \notin dom(subtree_t)$ then
13        return NIL

FIG. 6

Algorithm 2: AugmentTT($t, trace, cmd$)

1 if $type_{t_+} = \Omega$ then
2     $traceToTree(trace, cmd)$
3 else
4     repeat
5        if $type_t = \mathbf{T}$ *or* $type_t = \mathbf{L}$ then
6           if $trace.assertOutcome$ then
7              if $type_{t_+} = \Omega$ then
8                  $t_+ \leftarrow traceToTree(trace.next, cmd)$
9                  return
10             else
11                 $t \leftarrow t_+$
12                 $trace \leftarrow trace.next$
13           else
14              if $type_{t_-} = \Omega$ then
15                 $t_- \leftarrow traceToTree(trace.next, cmd)$
16                 return
17              else
18                 $t \leftarrow t_-$
19                 $trace \leftarrow trace.next$
20        else if $type_t = \mathbf{V}$ then
21           if $trace.value \in dom(subtree_t)$ then
22              $t \leftarrow subtree_t[trace.value]$
23              $trace \leftarrow trace.next$
24           else
25              $subtree_t[trace.value] \leftarrow traceToTree(trace.next, cmd)$
26              return
27     until;

FIG. 7

Algorithm 3: TraceToTree(*trace, cmd*)

1 if *empty(trace)* then
2     return $\mathbf{L}(cmd)$
3 else if *head(trace)* = $\mathbf{Read}(attr, val)$ then
4     return $\mathbf{V}(attr, emptyArray.add(attr, \text{TraceToTree}(trace.tail, val)))$
5 else
6     *head(trace)* = $\mathbf{Test}(attr, val, outcome)$
7     if *outcome* then
8        return $\mathbf{T}(attr, \text{TraceToTree}(trace.tail, val), \Omega)$
9     else
10        return $\mathbf{T}(attr, \Omega, \text{TraceToTree}(trace.tail, val))$

FIG. 8

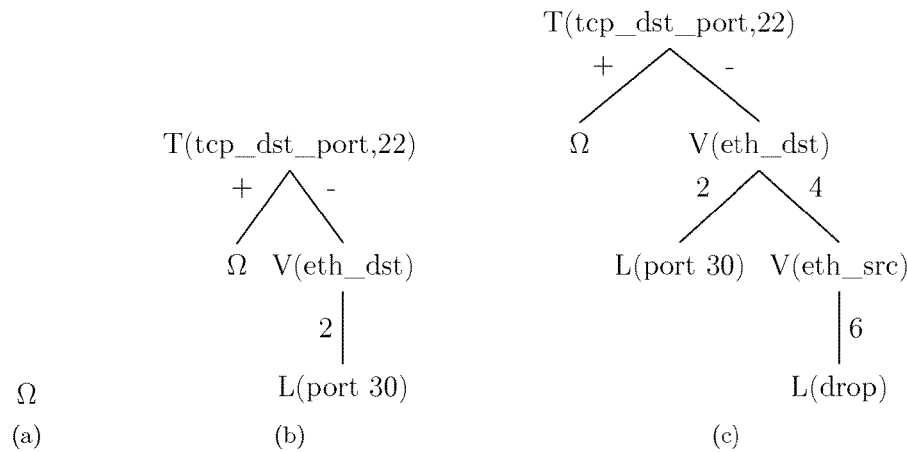

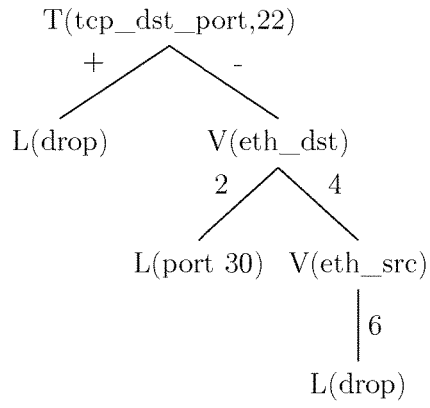

FIG. 9

Algorithm 4: BuildFT($t, match$)

1    assumes variables *prio* and *rules* are initialized to 0 and [] before starting;
2    T nodes in $t$.;
3    if $type_t = L$ then
4        |   $rules \leftarrow rules \uplus prio \mapsto \{(match, value_t)\}$;
5        |   $prio \leftarrow prio + 1$;
6    else if $type_t = \Omega$ then
7        |   $rules \leftarrow rules \uplus prio \mapsto \{(match, \text{ToController})\}$;
8        |   $prio \leftarrow prio + 1$;
9    else if $type_t = T$ then
10      |   $m = list(match)$;
11      |   $m.append((attr_t, value_t))$;
12      |   BuildFT($t_+, m, list$);
13      |   $rules \leftarrow rules \uplus prio \mapsto \{(m, \text{ToController})\}$;
14      |   $prio \leftarrow prio + 1$;
15      |   BuildFT($t_-, match$);
16    else if $type_t = V$ then
17      |   for $v \in dom(subtrees_t)$ do
18          |   $m = list(match)$;
19          |   $m.append((attr_t, v))$;
20          |   BuildFT($subtrees_t[v], m$);

FIG. 10

$$Root ::= TT \qquad (1)$$
$$TT ::= \Omega \qquad (2)$$
$$TT ::= L\ ports \qquad (3)$$
$$TT ::= T\ Attr\ val\ TT_1\ TT_2 \qquad (4)$$
$$TT ::= V\ Attr\ Subtrees \qquad (5)$$
$$Subtrees ::= \{(val, TT)\} \qquad (6)$$

FIG. 11

Equations for tree nodes:

$$Root.ft = child.ft \tag{7}$$

$$Root.TT.mch = emptyMatch \tag{8}$$

$$Root.TT.pc = emptyPC \tag{9}$$

$$L.comp = True \tag{10}$$

$$L.empty = False \tag{11}$$

$$L.mpu = maxPrio(L.pc) \tag{12}$$

$$L.ft = L.mpu \mapsto \{(L.mch, L.ports)\} \tag{13}$$

$$\Omega.comp = True \tag{14}$$

$$\Omega.empty = True \tag{15}$$

$$\Omega.mpu = maxPrio(\Omega.pc) \tag{16}$$

$$\Omega.ft = \Omega.mpu \mapsto \{(\Omega.mch, ToController)\} \tag{17}$$

$$V.comp = False \tag{18}$$

$$V.empty = \begin{cases} True & \forall t \in V.subtrees : t.empty \\ False & \text{otherwise.} \end{cases} \tag{19}$$

$$V.mpu = \max\{t.mpu : t \in V.subtrees\} \tag{20}$$

$$V.ft = \biguplus_{t \in V.subtrees} t.ft \tag{21}$$

$$V.subtrees_i.mch = addMch((V.attr, t.val), V.mch) \tag{22}$$

$$V.subtrees_i.pc = V.pc \tag{23}$$

$$T.comp = \neg t_-.empty \land t_-.comp \tag{24}$$

$$T.empty = t_+.empty \land t_-.empty \tag{25}$$

$$T.mpu = \begin{cases} t_+.mpu & t_-.empty \\ t_-.mpu & \text{otherwise.} \end{cases} \tag{26}$$

$$T.ft = \begin{cases} t_+.ft & t_-.empty \\ t_+.ft \uplus t_-.ft & \neg t_-.empty \land t_+.comp \\ t_+.ft \uplus ft_* \uplus t_-.ft & \text{otherwise.} \end{cases} \tag{27}$$

$$ft_* = [(t_+.mpu + 1, t_+.mch, ToController)] \tag{28}$$

$$t_-.mch = T.mch \tag{29}$$

$$t_+.mch = addMch((T.attr, T.val), T.mch) \tag{30}$$

$$t_+.pc = T.pc \tag{31}$$

$$t_-.pc = addPC((prio_*, T.attr, T.val), T.pc) \tag{32}$$

$$prio_* = \begin{cases} t_+.mpu + 2 & t_+.comp \\ t_+.mpu + 1 & \text{otherwise.} \end{cases} \tag{33}$$

Algorithm 5: CompressTrace($e_1 \ldots e_n$)

1   $t' \leftarrow$ empty list ;
2   for $a \in \mathit{Attrs}$ do
3      $knownRange_a = dom_a$
4   for $i \in \{1 \ldots n\}$ do
5      if $range(e_i) \nsubseteq knownRange_{attribute(e_i)}$ then
6          $knownRange_a = knownRange_a \cap range(e_i);$
7          $append(t', e_i)$
8   return $t'$

Algorithm 6: IncrementalCompile($t, trace, result, ft$)

1 Determine location *node* at which the tree $t$ will be extended, using a modified version to the AugmentTT algorithm;
2 if $type_{node} = \mathbf{V}$ then
3     let *trace'* be the remainder of the trace at the extension point *node*;
4     let $t' = \text{TraceToTree}(trace', result)$;
5     let *rules* be compiled using OptBuildFT after setting the inherited attributes, namely *mch* and *pc*, according to equations 22 and 23;
6     if $\mathbf{V}.mpu \geq t'.mpu$ then
7        Augment $t$ with *trace* and return *rules*;

8 Augment $t$ with *trace*, apply full compilation algorithm and update $ft$ accordingly;
9 return *Changes between new rule set and old rule set ft*;

FIG. 15

Algorithm 7: CoreOptimize($ft$)

1 Remove all rules in $ft$ that forward to controller;
2 for *each destination d mentioned in ft* do
3     $cmd$ = action of highest priority rule in $ft$ overlapping destination $d$.;
4     $p$ = priority of lowest priority rule that overlaps packets to $d$ and agrees with $cmd$ and such that all higher priority rules overlapping with packets to $d$ agree with $cmd$.;
5     Delete rules at priority $\geq p$ matching on destination $d$ from $ft$.;
6     $ft \leftarrow ft \uplus (p \mapsto \{(\text{to }:d, cmd)\})$;

FIG. 16

```
Algorithm 10: CANCELUPDATES({c_k})
1  z = empty dictionary keyed on priority-match pair (p, m)
2  for c ∈ {c_k} do
3      let t = c.type
4      let p = c.rule.priority
5      let m = c.rule.match
6      let a = c.rule.action
7      if (p, m) ∉ z then
8          if t = Insert then
9              z[(p, m)] = (t, a, ⊥)
10         else
11             z[(p, m)] = (t, a, a)
12     else
13         let (t', a', a_0) = z[(p, m)]
14         if t' = Delete ∧ t = Insert ∧ a = a_0 then
15             delete (p, m) from z
16         else if t' = Delete ∧ t = Insert ∧ a ≠ a_0 then
17             z[(p, m)] = (Modify, a, a_0)
18         else if t' = Insert ∧ t = Delete then
19             delete (p, m) from z
20         else if t' = Modify ∧ t = Delete then
21             delete (p, m) from z
22         else
23             error: impossible
24 return z
```

FIG. 22

MANAGING NETWORK FORWARDING CONFIGURATIONS USING ALGORITHMIC POLICIES

CROSS REFERENCE TO RELATED APPLICATIONS

This application is a national stage filing under 35 U.S.C. § 371 of International Application No. PCT/US2014/031249, filed Mar. 19, 2014, and entitled "Managing Network Forwarding Configurations Using Algorithmic Policies," which claims the priority benefit, under 35 U.S.C. § 119(e), of U.S. Provisional Application Ser. No. 61/803,378, filed Mar. 19, 2013, and entitled "Dynamic Modeling and Optimization of Algorithmic Policies for Software-Defined Networks," which applications are hereby incorporated by reference to the maximum extent allowable by law. This Application also claims the priority benefit, under 35 U.S.C. § 119(e), of U.S. Provisional Application Ser. No. 61/853,056, filed Mar. 27, 2013, and entitled "Tracing, Modeling and Optimization of Algorithmic Policies for Software-Defined Networks," which application is hereby incorporated by reference to the maximum extent allowable by law.

BACKGROUND

A recent development in computer networking is the notion of Software-Defined Networks ("SDN"s), whereby a network is allowed to customize its behaviors through centralized policies at a conceptually centralized network controller. In particular, OpenFlow (introduced in N. McKeown, and T. Anderson, H. Balakrishnan, G. Parulkar, L. Peterson, J. Rexford, S. Shenker, J. Turner, "OpenFlow: Enabling Innovation in Campus Networks", SIGCOMM Comput. Commun. Rev., April 2008, 38, pp. 69-74, which is incorporated herein by reference in its entirety) has established (1) flow tables as a standard data-plane abstraction for distributed switches, (2) a protocol for the centralized controller to install forwarding rules and query state at switches, and (3) a protocol for the switches to forward to the controller packets not matching any rules in its switch-local forwarding table. We refer to the programming of the centralized controller as "SDN programming", and a network operator who conducts SDN programming as an "SDN programmer", or just "programmer".

Data communication networks, referred to herein as "networks", can include interconnected switches, virtual switches, hubs, routers, and/or other devices configured to handle data packets as they pass through the network. These devices are referred to herein as "network elements". We also use the term "switch" synonymously with "network element", unless otherwise noted.

Sources and destinations may be considered endpoints on the network. Endpoint systems, along with the users and services that reside on them, are referred to herein as "endpoints". We also use the term "host" synonymously with endpoint. As used herein, the term "data forwarding element" refers to an element in the network that is not an endpoint, and that is configured to receive data from one or more endpoints and/or other network elements and to forward data to one or more other endpoints and/or other network elements.

Network elements, including data forwarding elements, may have "ports" at which they interconnect with other devices via some physical medium, such as Ethernet cable or optical fibre. We refer to a switch port which connects the port to an endpoint as an "edge port" and the communication link connecting the endpoint to the switch port as an "edge link". We refer to a switch port which connects the port to another switch port (typically on a different switch) as a "core port" and the link connecting the two switches as a "core link".

The terms "topology" and "network topology" refer to the manner in which switches are interconnected. A network topology is often mathematically represented as a finite graph, including a set of nodes representing network elements, a set of links representing communication links, and a function indicating, for each link, the two network elements connected by the link as well as the ports at which the link attaches on the two network elements. This information can be augmented with extra attributes of nodes and links, such as the bandwidth of each link.

A "packet" or "frame" is the fundamental unit of data to be communicated in a packet-switched computer network. A packet contains a sequence of bits, wherein some portion of those bits, typically the initial bits, form a "header" (also referred to as a "frame header" or "packet header") which contains information used by the network to provide network services. For example, an Ethernet frame header includes the sender (also known as the source) and the recipient (also known as the destination) Ethernet addresses. The header is structured into "fields" which are located in specific positions in the header. For example, the Ethernet frame header includes fields for the source and destination Ethernet addresses of the frame. We define the symbolic notation p.a to denote the value of field a in the packet p.

The term "forwarding behavior" denotes the manner in which packets are treated in a network, including the manner in which packets are switched through a sequence of switches and links in the network. The forwarding behavior may also refer to additional processing steps applied to packets during forwarding, such as transformations applied to a data packet (e.g. tagging packets with virtual local area network (VLAN) identifiers) or treating the packet with a service class in order to provide a quality of service (QoS) guarantee. We use the term "global forwarding behavior of a packet" to refer to the manner in which a packet is forwarded from the edge port at which it enters the network to other edge ports at which it exits. We use the phrase "global packet forwarding behavior" to refer to a characterization of the global forwarding behavior of all packets.

Network elements may implement a protocol similar to OpenFlow (www.opennetworking.org/about/onf-documents; see, e.g., "OpenFlow Switch Specification, Version 1.0.0, Dec. 31, 2009, which is incorporated herein by reference in its entirety), wherein a network element has a local collection of prioritized rules with which to process packets, known herein as a "rule set". We designate such network elements as "Openflow-like network elements". Each rule may have a priority level, a condition that specifies which packets it may apply to, and an action with which to process applicable packets. Openflow-like network elements communicate with a component known as the "controller," which may be implemented as one or more computers such as control servers. The controller interacts with an Openflow-like network element in order to control its packet processing behavior, typically by configuring the rule sets of the Openflow-like network elements.

SUMMARY

One type of embodiment is directed to a method in a data communications network comprising a plurality of data forwarding elements each having a set of forwarding configurations and being configured to forward data packets according to the set of forwarding configurations, the data communications network further comprising at least one controller including at least one processor configured to update forwarding configurations in at least some of the plurality of data forwarding elements, the method comprising: accessing, at the at least one controller, a packet-processing policy defined by a user in a general-purpose programming language other than a programming language of data forwarding element forwarding rules, the packet-processing policy specifying how data packets are to be processed through the data communications network via the at least one controller; deriving, from the user-defined packet-processing policy, using the at least one processor, a forwarding configuration for at least one data forwarding element of the plurality of data forwarding elements in the data communications network; and applying the derived forwarding configuration to the at least one data forwarding element.

Another type of embodiment is directed to a network control system comprising one or more interfaces to a plurality of data forwarding elements in a data communications network, each of the plurality of data forwarding elements having a set of forwarding configurations and being configured to forward data packets according to the set of forwarding configurations; at least one processor; and at least one storage medium storing processor-executable instructions that, when executed by the at least one processor, perform a method comprising: accessing a packet-processing policy defined by a user in a general-purpose programming language other than a programming language of data forwarding element forwarding rules, the packet-processing policy specifying how data packets are to be processed through the data communications network via the network control system; deriving, from the user-defined packet-processing policy, a forwarding configuration for at least one data forwarding element of the plurality of data forwarding elements in the data communications network; and applying the derived forwarding configuration to the at least one data forwarding element.

Another type of embodiment is directed to at least one processor-readable storage medium encoded with processor-executable instructions that, when executed, perform a method in a data communications network comprising a plurality of data forwarding elements each having a set of forwarding configurations and being configured to forward data packets according to the set of forwarding configurations, the data communications network further comprising at least one controller configured to update forwarding configurations in at least some of the plurality of data forwarding elements, the method comprising: accessing, at the at least one controller, a packet-processing policy defined by a user in a general-purpose programming language other than a programming language of data forwarding element forwarding rules, the packet-processing policy specifying how data packets are to be processed through the data communications network via the at least one controller; deriving, from the user-defined packet-processing policy, a forwarding configuration for at least one data forwarding element of the plurality of data forwarding elements in the data communications network; and applying the derived forwarding configuration to the at least one data forwarding element. Another type of embodiment is directed to a method in a data communications network comprising a plurality of data forwarding elements and at least one control server including at least one processor, the method comprising: accessing, at the at least one control server, a logically-centralized algorithmic policy defined by a user in a general-purpose programming language; and automatically managing, from the at least one control server using the at least one processor, forwarding configurations at the plurality of data forwarding elements to implement distributed execution of the algorithmic policy in the data communications network.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 depicts an example trace tree in accordance with some embodiments;

FIG. 6 illustrates an exemplary partial function that may be encoded in a trace tree in accordance with some embodiments, in the form of the searchTT method;

FIG. 7 illustrates exemplary steps to augment a trace tree in accordance with some embodiments, using the AugmentTT algorithm;

FIG. 8 illustrates exemplary steps to convert a single trace to a trace tree in accordance with some embodiments, using the TraceToTree algorithm;

FIG. 9 illustrates an example of augmenting an initially empty trace tree with several traces, in accordance with some embodiments;

FIG. 10 illustrates exemplary steps to build a flow table from a trace tree in accordance with some embodiments, using the buildFT algorithm;

FIG. 11 illustrates an exemplary context-free grammar for trace trees that may be used in accordance with some embodiments, in connection with the optBuildFT algorithm;

FIG. 12 lists exemplary equations of an attribute grammar that that may be used in accordance with some embodiments, in connection with the optBuildFT algorithm;

FIG. 15 illustrates exemplary steps to calculate an incremental update to a rule set from an incremental update to a trace tree in accordance with some embodiments, in order to maintain a rule set in correspondence with a trace tree as specified by the optBuildFT method, using the incrementalCompile algorithm;

FIG. 16 illustrates exemplary steps to optimize the rule sets of network elements in accordance with some embodiments, using the CoreOptimize algorithm;

FIG. 22 illustrates an exemplary algorithm for update minimization in accordance with some embodiments.

DETAILED DESCRIPTION

Figure 1:
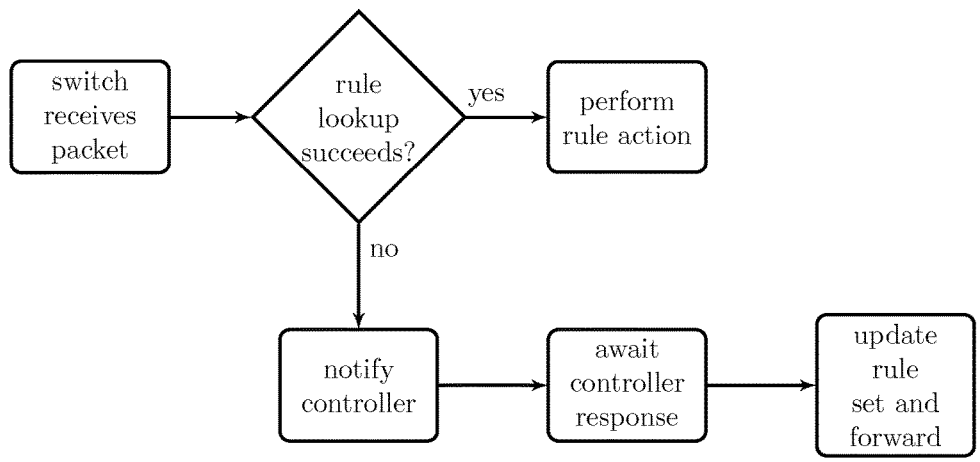
FIG. 1 is a flow chart illustrating how packets may be processed at an Openflow-like network element.

Some embodiments described herein relate to the control of software-defined networks ("SDN"s), including those using OpenFlow-compatible switches, by which we mean any electronic devices, such as switches, routers, or general purpose computers performing essential packet-forwarding services and implementing the OpenFlow protocol or similar control protocols.

Some embodiments may provide benefits such as allowing users to customize the behavior of a network with nearly arbitrary programs, such as algorithmic policies, which specify desired forwarding behavior of packets without concern for the configuration formats accepted by the network elements. Another potential benefit of some embodiments may be to automatically, dynamically, efficiently and optimally generate configurations for network elements from such algorithmic policies, for the purpose of achieving high performance. However, embodiments are not limited to any of these benefits, and it should be appreciated that some embodiments may not provide some or any of the above-discussed benefits.

The inventors have recognized that one challenge in engineering a successful SDN lies in providing a programming environment (including language, libraries, runtime system) that is both convenient to program and expressive enough to allow a wide variety of desired network behaviors to be implemented. Another challenge that the inventors have recognized is achieving adequate network performance, so that the SDN does not substantially diminish network performance compared with traditional network control techniques. The inventors have recognized that no existing systems succeed in achieving these goals.

The inventors have recognized that some existing systems, such as "NOX" (Gude, N., Koponen, T., Pettit, J., Pfaff, B., Casado, M., McKeown, N. and Shenker, S., "NOX: Towards an Operating System for Networks", SIGCOMM Comput. Commun. Rev., Jul. 2008, 38, pp. 105-110), Beacon (openflow.stanford.edu/display/Beacon/Home), and "Floodlight" (floodlight.openflowhub.org), provide basic SDN controllers for OpenFlow-capable network elements. These controllers allow SDN programmers to write arbitrary programs for controlling OpenFlow network elements, and hence make it possible for a programmer to express arbitrary network behaviors and to achieve high performance (subject to functional and performance constraints of the network elements). However, these tools require that the programmer explicitly manipulate the network element configuration—a tedious, complex, and error prone activity, if done in a way to achieve high performance. As a result, the inventors have recognized that it is in practice very difficult to build reliable and fast networks using these tools.

The inventors have recognized that some other systems, including "Frenetic" (Foster, N., Harrison, R., Freedman, M., Monsanto, C., Rexford, J., Story, A. and Walker, D., "Frenetic: a network pro-gramming language", Proceedings of the 16th ACM SIGPLAN ICFP 2011, 2011, pp. 279-291) and "NetCore" (Monsanto, C., Foster, N., Harrison, R. and Walker, D., "A compiler and run-time system for network programming languages", Proc. of POPL '12, 2012, pp. 217-230), provide enhanced, declarative programming systems for OpenFlow networks. These systems attempt to make programming such networks easier and more convenient. Both of these systems require programmers to express network configurations in terms of packet processing rules. Although these systems alleviate some of the problems with programming these rules (as compared with basic SDN controllers), the inventors have recognized that this approach still requires programmers to convert their desired behavior into rules and creates a two-tiered model in which undetected errors can arise when the program logic that generates rules and the rules themselves are not consistent.

Furthermore, the inventors have recognized that both Frenetic and NetCore have inefficient implementations. Frenetic uses only exact-match OpenFlow rules (discussed further below). The inventors have recognized that when using exact-match rules, many more rules are required to handle the overall traffic in the network than is supported in the rule tables of network elements. Hence, packets often fail to match in the local rule set of a network element, and rules present in the rule sets of network elements must often be evicted to make space for other rules. This causes a substantial number of packets to be diverted to the central controller, and the penalty for such a delay is typically severe, taking anywhere from hundreds of microseconds to tens of milliseconds. In contrast, packets forwarded directly by the network element are typically forwarded within a few nanoseconds. As a result, the performance of the network, in terms of throughput and latency experienced by users of the network, suffers when significant numbers of packets are diverted to the controller. The inventors have recognized that NetCore uses switch resources well by taking advantage of "wildcard" rules (discussed further below), but uses a compilation algorithm that has exponential time complexity and that fails to optimize generated rule sets in several ways. In addition, the inventors have recognized that NetCore's language is very limited and does not permit the user to express behaviors that are typical in networks, such as forwarding along shortest paths in a network. As a result, NetCore is used in practice only as an intermediate language in compilers accepting network controllers written in more expressive languages.

By contrast, some embodiments described herein allow users to program in a highly expressive and convenient language for specifying the forwarding behavior of a network without regard to the rules that network elements should use for forwarding packets. In some embodiments, programmers may write nearly arbitrary programs to express the behavior of an SDN, using a variety of programming languages, whereby the programs specify packet forwarding behavior rather than network element configurations. Some embodiments efficiently generate rule sets for network elements that use their critical resources optimally so that the overall network performs at a level comparable to a non-SDN network. In some embodiments, the network system may use automated algorithms to configure network elements to achieve the behavior specified by the user-defined program, improving performance by increasing the frequency with which packets are processed locally and independently within network elements. Some embodiments may provide less complicated and less error-prone methods to implement SDNs than traditional methods. Some embodiments may allow the SDN programmer to program networks with a simple, flexible programming method, while using automated procedures to control network elements to achieve correct and efficient network services. However, embodiments are not limited to any of these benefits, and it should be appreciated that some embodiments may not provide any of the above-discussed benefits and/or may not address any of the above-discussed deficiencies that the inventors have recognized in conventional techniques.

In some embodiments, the SDN programmer may apply a high-level algorithmic approach to define network-wide forwarding behaviors of network flows. The programmer may simply define a function f, expressed in a general-purpose, high-level programming language (e.g., a programming language other than the programming language in which forwarding rules and/or other forwarding configurations are programmed at the data forwarding elements), which appears conceptually as though it is run by the centralized controller on every packet entering the network. In other words, the programmer may be presented with the abstraction that his program f is executed on every packet passing through the network, even though in practice the network may avoid actually executing f on every packet at the central controller, utilizing network elements to perform the processing locally instead. In designing the function f, is some embodiments the programmer need not adapt to a new programming model, but rather may use standard programming languages to design arbitrary algorithms to classify input packets and compute how packets should be forwarded to organize traffic. We refer to such programs as "algorithmic policies" or "user-defined algorithmic policies" and refer to this model as "SDN programming of algorithmic policies". Algorithmic policies and declarative policies do not exclude each other; in fact, the inventors have appreciated that algorithmic programming can be useful in implementing compilers or interpreters for declarative languages for network policies.

Some embodiments may provide the SDN programmer with a simple and flexible conceptual model. The inventors have recognized, however, that a naïve implementation may come at the expense of performance bottlenecks. Conceptually, in some embodiments f may be invoked on every packet, potentially leading to a computational bottleneck at the controller; that is, the controller may not have sufficient computational capacity to literally invoke f on every packet. Also, the inventors have recognized that the bandwidth demand on the communication infrastructure to send every packet through the controller may not always be practical. The inventors have further recognized that these bottlenecks may be in addition to the extra latency of forwarding all packets to the controller for processing as described in Curtis, A., Mogul, J., Tourrilhes, J., Yalagandula, P., Sharma, P. and Banerjee, S., "DevoFlow: Scaling Flow Management for High-Performance Networks", Proceedings of the ACM SIGCOMM 2011 conference, 2011, pp. 254-265.

Accordingly, some embodiments may achieve the simplicity, flexibility, and expressive power of the high-level programming model, along with incorporated techniques to address some or all of the aforementioned performance challenges. In some embodiments, SDN programmers may be able to enjoy simple, intuitive SDN programming, and at the same time achieve high performance and scalability. However, embodiments are not limited to any of these benefits, and it should be appreciated that some embodiments may not provide some or any of the above-discussed benefits.

Various embodiments may make use of any or all of several techniques discussed herein. In some embodiments, a user may define a packet-processing policy in a general-purpose programming language, specifying how data packets are to be processed through the network via the controller. The user-defined packet-processing policy may be accessed at the controller, and forwarding configurations for data forwarding elements in the network may be derived therefrom. Any suitable technique(s) may be used to derive network element forwarding configurations from the user-defined packet-processing policy, including static analysis and/or dynamic analysis techniques. For example, in some embodiments, the user-defined packet-processing policy may be analyzed using a compiler configured to translate programming code of the packet-processing policy from the general-purpose programming language in which it is written to the programming language of the network element forwarding rules. Alternatively or additionally, in some embodiments the user-defined packet-processing policy may be analyzed (e.g., modeled) at runtime while the policy is applied to process data packets at the controller.

In some embodiments, the user's program may be executed in a "tracing runtime" that instruments the user's program so that when run, the tracing runtime will record certain steps performed by the program, these recordings being named traces. In some embodiments, a "dynamic modeler" may accumulate traces over numerous runs of the program to dynamically generate an abstract model of the program. In some embodiments, a "dynamic optimizer" may use this dynamically learned model to generate configurations for network elements using several optimization techniques to generate optimized configurations for some or all of the network elements, taking advantage of hardware features of the network elements and/or network topology constraints. Some embodiments provide efficient implementations of the dynamic optimization, including "incremental" algorithms to convert a change in the model of the algorithmic policy into a change in the network element configurations.

Some embodiments may address the aforementioned challenges of SDNs by providing the programmer with a highly expressive (since it allows arbitrary deterministic algorithms, i.e., those expressible on a deterministic Turing machine) and convenient (since there is no need to specify complex network configurations) programming interface. Additionally, some embodiments may solve aforementioned performance challenges in implementing SDNs by more effectively using hardware features in network elements to increase the frequency with which packets arriving at a network element can be processed locally within the network element. The inventors have appreciated that such increased packet processing locality may have at least two consequences. On the one hand, locality may result in fewer packets being delayed by diversions to the centralized controller. On the other hand, locality may reduce the utilization of communication links between the network elements and the controller and may reduce the computational load placed on the controller, both of which typically result in reduced time to process a diverted packet. Overall, the inventors have appreciated that the effect may be to reduce the expected delay that packets experience in traversing the network, potentially resulting in improved network performance. However, embodiments are not limited to any of these benefits, and it should be appreciated that some embodiments may not provide any of the above-discussed benefits and/or may not address any of the above-discussed deficiencies that the inventors have recognized in conventional techniques.

Accordingly, some embodiments relate to a data communication network comprising a multiplicity of network elements and a controller that implements a user-defined (user's) algorithmic policy specifying global packet forwarding behavior. The user's algorithmic policy is understood to be an algorithm that accesses packet and optionally network state information through a defined interface and specifies packet forwarding behavior, i.e., how packets should be processed. In some embodiments, the algorithm need not specify how network elements are to be configured. In particular embodiments, the algorithm can access not only packet and network state information but also information external to the network, e.g. a database maintained by some external entity.

In some embodiments, the user-defined algorithmic policy can specify a path through the network along which path a packet should be forwarded. Alternatively or additionally, it can specify a subtree of the network along which subtree a packet should be forwarded.

In a more specific embodiment, the network's controller may use a trace tree to model the user-defined algorithmic policy. The trace tree may be a rooted tree in which each node t has a field $type_t$, whose value is one of the symbols L, V, T or $\Omega$. The meaning of these symbols is discussed below. In some embodiments, the controller may construct the trace tree iteratively by executing the user's algorithmic policy on a packet, recording a trace consisting of the sequence of function applications performed during the execution of the algorithmic policy, and using said trace and results returned by the algorithmic policy for initiating or building out/augmenting the trace tree. The same operation may then be performed on the next packet, and so forth. In some embodiments, the controller can make use of algorithm AugmentTT, discussed below, for initiating and building out a trace tree. In a particular version of this embodiment, the trace tree may lack T nodes.

In a further more specific embodiment, the controller may model the user's algorithmic policy as a trace tree and use the trace tree for generating rule sets for network elements so that the network comprising the network elements forwards packets in accordance with the algorithmic policy. In some embodiments, the controller may not execute the user's algorithmic policy on all packets, but only on packets that have been forwarded to the controller by a network element because they failed to match any local rule. Resulting traces and results may be recorded and used for updating the trace tree and generating new rule sets.

In some embodiments, the controller can use algorithms buildFT or optBuildFT, discussed below, for compiling rule sets from trace trees. To enhance network performance, in some embodiments the controller can use an incremental algorithm for maintaining a correspondence between trace tree and rule sets. The inventors have appreciated that the use of such an algorithm may reduce the instances in which addition of a new trace prompts recompilation of the entire trace tree. An example incremental algorithm is algorithm incrementalCompile, discussed below. To augment network performance, in some embodiments the controller can use an algorithm for optimizing and reducing the size of rule sets at network elements by partitioning packet processing responsibilities among different network elements based on their location in the network. A particular algorithm used in some embodiments can distinguish edge links and core links. An example algorithm is CoreOptimize, discussed below.

In particular embodiments of networks relying on trace trees for modeling users' algorithmic policies, the controller may execute the algorithmic policy through a collection of functions named "Tracing Application Programming Interface", abbreviated "TAPI", discussed below. TAPI may include methods for reading values of packets and/or network attributes such as topology information and/or host locations. In other particular embodiments, the TAPI may alternatively or additionally include methods for testing Boolean-valued attributes of packets.

In particular embodiments of networks relying on trace trees for modeling users' algorithmic policies, the algorithm compressTrace, discussed below, may be utilized for shortening traces produced from executions of the algorithmic policy.

Some embodiments relate to a method for establishing and operating a network comprising a multiplicity of network elements and a controller. In this exemplary method, a controller may (1) accept a user's algorithmic policy, (2) execute the algorithmic policy on a packet, (3) record a trace consisting of the sequence of function applications performed during the execution of the algorithmic policy, and (4) use said trace and results returned by the algorithmic policy for initiating or building out a trace tree.

In a more specific embodiment of the method, the algorithmic policy may be an algorithm that accesses packet and network state information through a defined interface.

In another more specific embodiment of the method, the algorithm may access packet, network state information, and/or network-external information relevant to determining packet forwarding policy through a defined interface.

In particular embodiments of the method, the controller may use algorithm AugmentTT, discussed below, for initiating or building out the trace tree.

In a further more specific embodiment of the method, the controller may use the trace tree for generating rule sets for network elements so that the network comprising the network elements forwards packets in accordance with the algorithmic policy. More specifically, in some embodiments the controller can compile rule sets using either algorithm buildFT or algorithm optBuildFT, discussed below.

In the latter embodiment, the controller can maintain a correspondence between trace trees and rule sets using an incremental algorithm. In some embodiments, the controller may utilize algorithm incrementalCompile, discussed below, for this purpose. To enhance network performance, in some embodiments the controller can utilize an algorithm for optimizing rule sets at network elements by partitioning packet processing responsibilities among different network elements based on their location in the network. More specifically, in some embodiments the latter algorithm distinguishes edge links and core links. Even more specifically, in some embodiments the algorithm is the algorithm CoreOptimize, discussed below.

In a particular embodiment, a controller may (1) accept a user's algorithmic policy, (2) execute the algorithmic policy on a packet, (3) record a trace consisting of the sequence of function applications performed during the execution of the algorithmic policy, (4) use said trace and results returned by the policy for initiating or building out a trace tree, and (5) use the trace tree for generating rule sets for network elements. In some embodiments, the controller may execute the algorithmic policy only on those packets that do not match in rule sets.

In particular embodiments, the controller may execute the algorithmic policy through a TAPI. In some embodiments, the TAPI may include methods for reading values of packets and/or network attributes such as topology information and/or host locations. In other particular embodiments, the TAPI may include methods for testing Boolean-valued attributes of packets.

In particular embodiments, the algorithm compressTrace, described below, may be utilized for shortening traces produced from executions of an algorithmic policy.

FIG. 1 is a flow chart indicating the processing of a packet arriving at an Openflow-like network element. When a packet arrives at a network element, the network element determines which rules, if any, are applicable to the packet (based on the conditions in the rules). If any applicable rules are found, the network element executes the action of the highest priority rule among these. If no applicable rules are found, the packet is forwarded to the controller. The controller may respond with an action to be performed for the packet, and may also perform other configuration commands on the network element; e.g., the controller may configure the network element rule set with a new rule to handle similar packets in the future. The rule set at an OpenFlow-like network element at any moment may be incomplete, i.e., the network element may encounter packets to which no rules in the rule set apply. The process just described and depicted in FIG. 1 may be used to add rules to an incomplete rule set as needed by traffic demands.

Figure 2:
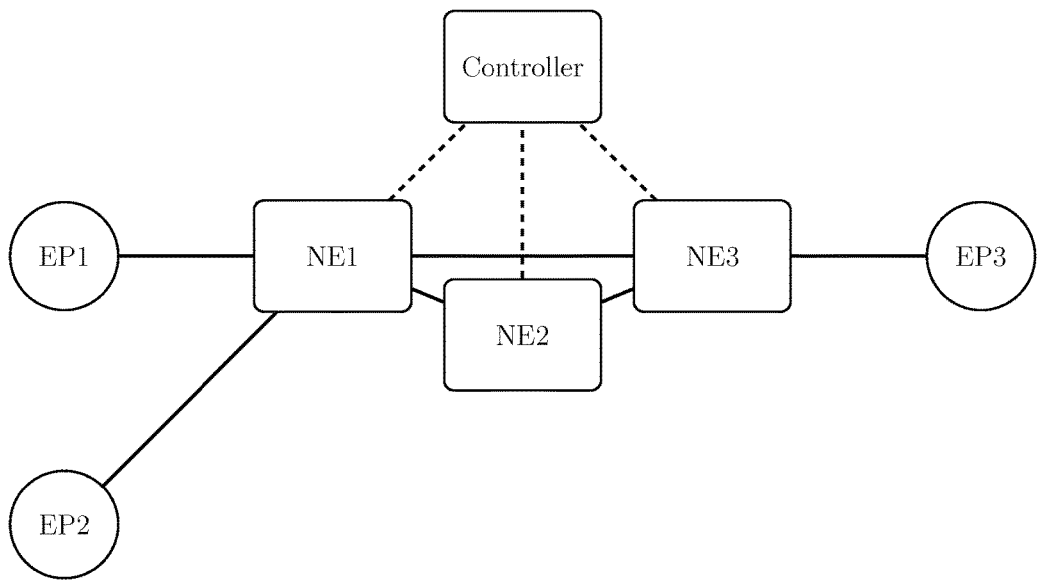
FIG. 2 is a drawing of an exemplary arrangement of components of an Openflow-like network; EP1-3 are endpoints; NE1-3 are network elements. Communication links between network elements or between network elements and endpoints are shown as solid lines, and logical control channels between network elements and the controller are shown as dashed lines.

A network composed of OpenFlow-like network elements along with a controller is referred to herein as an "OpenFlow-like network". FIG. 2 depicts an exemplary arrangement of some components that may exist in such a network, including three exemplary network elements ("NE"), three exemplary endpoints ("EP") and one exemplary controller. One or more controllers may be present in an OpenFlow-like network, and may be implemented as one or more processors, which may be housed in one or more computers such as one or more control servers. The diagram in FIG. 2 depicts several exemplary communication links (solid lines) between NEs and between NEs and EPs. The diagram also depicts several exemplary logical control channels (dashed lines) used for communication between the NEs and the controller. If the NEs are OpenFlow-like network elements then (some version of) the OpenFlow protocol may be used to communicate between controller and network elements. The controller need not be realized as a single computer, although it is depicted as a single component in FIG. 2 for ease of description.

The condition in a rule of a rule set is herein known as a "match condition" or "match". While the exact form and function of match conditions may vary among network elements and various embodiments, in some embodiments a match condition may specify a condition on each possible header field of a packet, named a "field condition". Each field condition may be either a single value, which requires that the value for a packet at the field is the given value, or a "*" symbol indicating that no restriction is placed on the value of that field.

An OpenFlow-like network element may allow additional flexibility in the match condition. In particular, a network element may allow a match condition to specify that the value of a given packet header field match a ternary bit pattern. A "ternary bit pattern" is a sequence where each item in the sequence is either 0, 1 or * (meaning "don't care"). The following condition describes when such a pattern pat on packet header field attr matches a packet pkt: suppose the value of attribute attr of pkt is written as a binary number with bits $b_n, \ldots, b_0$ and the pattern is the sequence $p_n, \ldots, p_0$. Then the pattern is said to match the packet if for every $i \in \{0 \ldots n\}$ such that $p_i \neq *$ we have $p_i = b_i$. In addition, an OpenFlow-like network element may support matching on a range of values of a packet header field. An example is that OpenFlow network elements may allow the field condition on the IP source field to consist of a range of IP addresses, as specified by an IP prefix.

We refer to a match condition which specifies the exact value (i.e., rather than using patterns containing "*" bits or a range expression) for every field of a packet header as an "exact match condition" or "exact match," and we refer to a rule whose match condition is an exact match condition as an "exact rule". However, in some cases when certain packet attributes have certain values, other attributes are ignored even in an exact match. For example, if the ethType attribute is not IP (Internet Protocol) type, then the fields such as IP destination address typically are not relevant, and thus an exact match to a non-IP packet may be made without an exact match condition in the IP destination address field. The term "exact match" should be understood to include such matches disregarding inapplicable fields. We refer to any match condition which is not an exact match condition as a "wildcard match condition" or "wildcard match". We refer to a rule whose match condition is a wildcard match condition as "wildcard rule".

Figure 3:
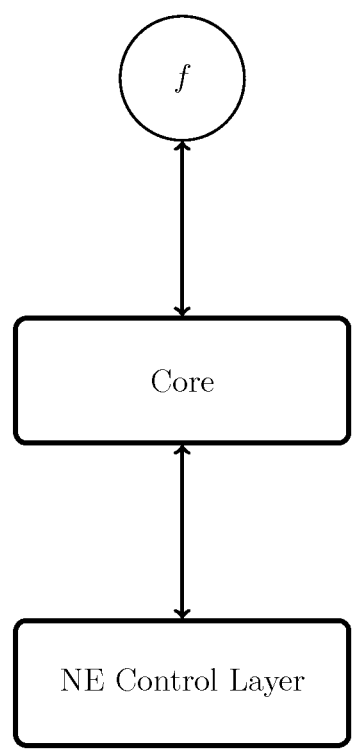
FIG. 3 is a drawing of exemplary components of a network controller in accordance with some embodiments; NE (Network Element) Control Layer communicates with network elements; Core executes the user-defined algorithmic policy, maintains information about the policy and network state, and issues configuration commands to the NE Control Layer; f is a user-defined algorithmic policy.

FIG. 3 depicts an exemplary arrangement of components of a network controller in accordance with some embodiments. "NE Control Layer" may include executable instructions to communicate with network elements, for example to send commands and receive notifications. In some embodiments, this component may be use various libraries and systems currently available for controlling network elements, for example, various basic OpenFlow controller libraries. The "Core" may include executable instructions that execute the user-defined algorithmic policy (e.g., in a tracing runtime), maintain information about the user-defined policy and the network state (the dynamic modeler), and/or issue configuration commands to the NE Control Layer (the dynamic optimizer). The component denoted "f"

represents the user-defined algorithmic policy that is executed on some packets by the Core and specifies the desired forwarding behavior of the network.

In some embodiments, an SDN programmer may specify the routing of each packet by providing a sequential (i.e., single-threaded and not parallel) program f, called an algorithmic policy, which may appear as if it were applied to every packet entering the network. Conceptually, the program f written by the user may represent a function of the following form (for concreteness we borrow the notation of functional programming languages to describe the input and output of f):

f::(Packet,Env)->ForwardingPath

Specifically, f may take as inputs a packet header and in some embodiments an environment parameter, which contains information about the state of the network, including, e.g., the current network topology, the location of hosts in the network, etc. The policy f returns a forwarding path, specifying whether the packet should be forwarded and if so, how. To support multicast, the ForwardingPath result can be a tree instead of a linear path. However, an algorithmic policy is not limited to returning a path. In some embodiments, an algorithmic policy may alternatively or additionally specify other actions, such as sending new packets during the processing of a packet, directing forwarding elements along the forwarding path to perform additional processing of a packet, such as modifying the packet, passing the packet through a traffic shaping element, adding the packet into a queue, etc. The return value of f therefore may specify global forwarding behavior for packets through the network. Except that it may conform to this type signature, in some embodiments f may involve arbitrary algorithms to classify the packets (e.g., conditional and loop statements), and/or to compute the forwarding actions (e.g., using graph algorithms). Unless otherwise specified, we use the terms "program" and "function" interchangeably herein when referring to algorithmic policies.

Although a policy f might in principle yield a different result for every packet, the inventors have appreciated that in practice a policy may depend on a small subset of all packet attributes and may therefore return the same results for all packets that have identical values for the packet attributes in this subset. As a result, many packets may be processed by f in the same way and with the same result. For example, consider the following algorithmic policy, which we write in the Python programming language (www.python.org), for concreteness:

```
def f(srcSwitch, inport, pkt):
    locTable[pkt.eth_src] = (srcSwitch, inport)
    if pkt.eth_dst in locTable:
        (dstSwitch,dstPort) = locTable[pkt.eth_dst]
        if pkt.tcp_dst_port == 22:
            outcome = securePath(srcSwitch,dstSwitch)
        else:
            outcome = shortestPath(srcSwitch,dstSwitch)
            outcome.append((dstSwitch,dstPort))
    else:
        outcome = drop
    return outcome
```

In the above example policy, f assigns the same path to two packets if they match on source and destination MAC addresses, and neither of the two packets has a TCP port value 22. Hence, if we invoke f on one packet, and then a subsequent packet arrives, and the two packets satisfy the preceding condition, we say that the first invocation of f is reusable or cacheable for the second.

Some embodiments therefore provide methods for observing both the outcome of f when applied to a packet as well as the sensitivity of that computation on the various packet attributes and network variables provided to f. By observing this information, some embodiments can derive reusable representations of the algorithmic policy and utilize this information to control network elements. The reusable representation is termed the "algorithm model" or "policy model".

Some embodiments therefore include a component named "tracing runtime" which executes the user-defined algorithmic policy such that both the outcome and the sequence of accesses made by the program to the packet and environment inputs are recorded, that recording being named a "trace". In particular, in some embodiments the program f may read values of packet and environment attributes and/or test boolean-valued attributes of the packet through a collection of functions, referred to herein as the "Tracing Application Programming Interface" ("TAPI"). The particular collection of functions and the specific input and output types can vary among embodiments, according to the details of the functionality provided by network elements and possibly the details of the programming language used to express the algorithmic policy. The following is an exemplary set of functions that can be included in the TAPI to access packet attributes:

| readPacketField | :: | (Packet, Field) | -> Value |
| testEqual | :: | (Packet, Field,Value) | -> Bool |
| srcInIPPrefix | :: | (Packet, IPPrefix) | -> Bool |
| dstInIPPrefix | :: | (Packet, IPPrefix) | -> Bool |

Figure 4:
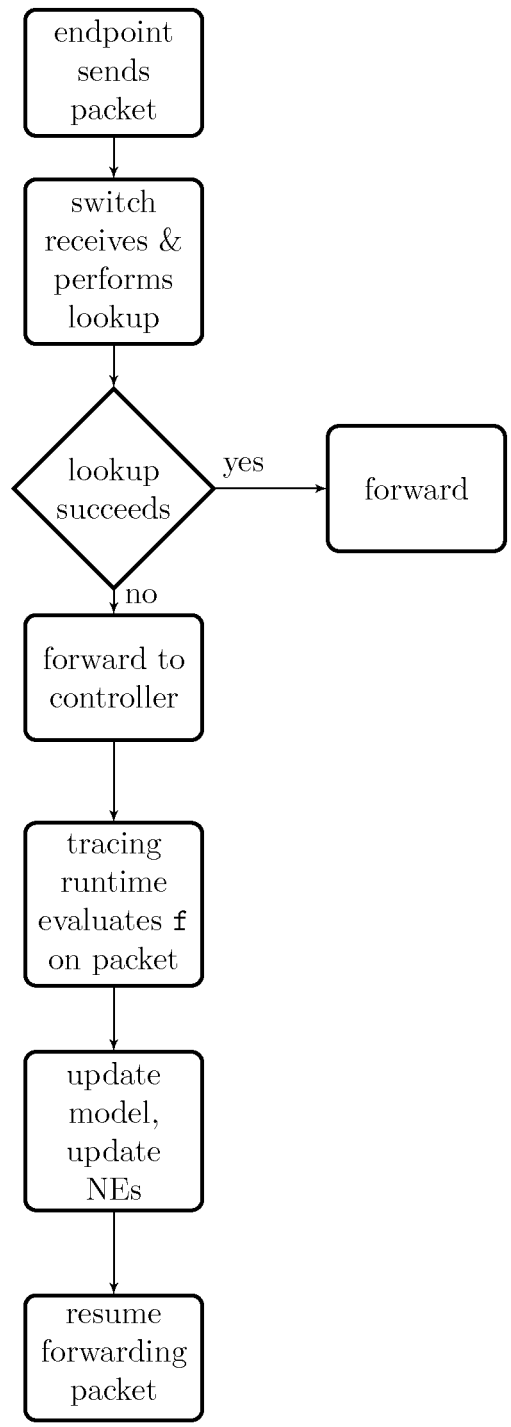
FIG. 4 is a flow chart of exemplary high-level steps to process a packet arriving at a network element in accordance with some embodiments.

FIG. 4 depicts a flow chart of exemplary high-level processing steps that may be performed in some embodiments in a network control system which makes use of the algorithm model gained from observing the outcomes of f and its sensitivity to its input arguments by using the tracing runtime. The exemplary process begins when an endpoint sends a packet. A NE then receives the packet and performs a lookup in the local rule set. If the search succeeds, the specified action is performed immediately. Otherwise, the NE notifies the controller of the packet. The controller executes f using a method allowing it to observe the occurrence of certain key steps during the program execution. It then updates its model of f and then computes and performs NE configuration updates. Finally, it instructs the NE to resume forwarding the packet which caused the notification. In some embodiments, many packets may be processed in parallel by the system. Conceptually, this can be considered as having many instances of the flowchart in existence at any one moment.

In certain embodiments, the algorithmic policy may be extended to allow the SDN programmer to specify computations to execute in reaction to various other network events, such as network element shutdown and/or initialization, port statistics up-dates, etc.

In the example algorithmic policy above, the programmer uses idiomatic syntax in the programming language used to express the policy to access packet fields. For example, the programmer writes pkt.eth_src to access the Ethernet source address of the packet, following an idiom of the Python programming language, in which this policy is expressed. When executed in the tracing runtime, the execution of this expression ultimately results in an invocation of a method in the TAPI, such as readPacketField, but this implementation may be hidden from the user for convenience.

Several methods of modeling the behavior of an algorithmic policy are possible, with the methods varying in the degree of detail being modelled, and typically in the type of inferences that can be drawn from the model. We present one such type of model, termed the "trace tree" model, in detail, although it should be understood that embodiments are not limited to this particular model.

We illustrate the trace tree model with an example before describing the technical details. Assume that the controller records each call to a function in the TAPI to a log while executing program f on a packet. Furthermore, suppose that during one execution of the program, the program returns path $p_1$ and that the recorded execution log consists of a single entry indicating that f tested whether the value of the TCP destination port of the packet was 22 and that the result of the test was affirmative. One can then infer that if the program is again given an arbitrary packet with TCP destination port 22, the program will choose path $p_1$ again. To take advantage of this observation, the controller in some embodiments may collect the traces and outcomes for these executions into a data structure known as a "trace tree", which forms an abstract model of the algorithmic policy. FIG. 5 depicts a trace tree formed after collecting the traces and outcomes from six executions of f, including the aforementioned trace and outcome. For example, one further execution in this example consists of the program first testing TCP destination port for 22 and finding the result to be false, reading the Ethernet destination field to have a value of 4, then reading the Ethernet source to have value 6, and finally returning a value indicating that the packet should be dropped. This trace and outcome is reflected in the rightmost path from the root of the trace tree in FIG. 5. In this example, the right child of a "Test" node models the behavior of a program after finding that the value of a particular packet attribute is not equal to a particular value.

In some embodiments, a trace tree may provide an abstract, partial representation of an SDN program. The trace tree may abstract away certain details of how f arrives at its decisions, but may still retain the decisions as well as the decision dependency of f on the input. In order to describe the trace tree and related techniques precisely, we briefly establish some notation. We assume there is a finite set of packet attributes Attrs={$a_1, \ldots a_n$} and we write p.a for the value of the a attribute of packet p. We write $dom_a$ for the set of values that attribute a can take on; e.g. p.a∈dom(a) for any packet and any attribute a.

In some embodiments, a "trace tree (TT)" may be a rooted tree where each node t has a field $type_t$ whose value is one of the symbols L, V, T or Ω and such that:

1. If $type_t$=L, then t has a $value_t$ field, which ranges over possible return values of the algorithmic policy. This node models the behavior of a program that returns $value_t$ without inspecting the packet further.
2. If $type_t$=V, then t has an $attr_t$ field with $attr_t$∈Attrs, and a $subtree_t$ field, where $subtree_t$ is a finite associative array such that $subtree_t$[v] is a trace tree for values v∈dom($attr_t$). This node models the behavior of a program which reads packet attribute $attr_t$ and continues to behave as $subtree_t$[v] if v is the value of the $attr_t$ attribute of the input packet.
3. If $type_t$=T then t has an $attr_t$ field with $attr_t$∈Attrs, a $value_t$ field, such that $value_t$∈dom($attr_t$), and two subtrees $t_+$ and $t_-$. This node models the behavior of a program that tests whether the value of the $attr_t$ field of a packet is $value_t$, and whose behavior is modelled by $t_+$ if the test is true, and $t_-$ otherwise.
4. If $type_t$=Ω then t has no fields. This node models arbitrary behavior, i.e. it represents a program about which we have no information.

In some embodiments, a trace tree may encode a partial function from packets to results. The exemplary "searchTT" algorithm, presented in FIG. 6, may be used in some embodiments for extracting the partial function encoded in the trace tree. This method accepts a trace tree and a packet as input and traverses the given trace tree, selecting subtrees to search as directed by the decision represented by each tree node and by the given packet, terminating at L nodes with a return value and terminating at Ω nodes with NIL.

A trace tree is referred to herein as "consistent with an algorithmic policy" f if and only if for every packet for which the function encoded by a trace tree returns an outcome, that outcome is identical to the outcome specified by f on the same packet.

In certain embodiments, a "dynamic modeler" component may be used to build a trace tree from individual traces and outcomes of executions of f. In some embodiments, the dynamic modeler may initialize the model of the algorithmic policy, f, with an empty tree, represented as Ω. After each invocation of f, a trace may be collected and the dynamic modeler may augment the trace tree with the new trace. Several methods of augmenting a trace tree are possible. In some embodiments, the augmentation method used may satisfy a requirement that the resulting trace tree must be consistent with the algorithmic policy f modeled by the trace tree, provided the input trace tree was consistent. More precisely: if a given trace tree is consistent with f and a trace is derived from f, then augmenting the trace tree with the given outcome and trace results in a new trace tree that is still consistent with f.

In certain embodiments, an exemplary algorithm referred to as "AugmentTT", presented in FIG. 7, may be used to implement the trace tree augmentation. For concreteness, the exemplary algorithm assumes that a trace is a linked list and assumes the following notation. Suppose trace is a trace. If the first item in trace is a read action, then value is the value read for the read action. If the first item is a test action, then trace.assertOutcome is the Boolean value of the assertion on the packet provided to the function when the trace was recorded. Finally trace.next is the remaining trace following the first action in trace.

Exemplary algorithm AugmentTT adds a trace and outcome to the trace tree by starting at the root of tree and descending down the tree as guided by the trace, advancing through the trace each time it descends down the tree. For example, if the algorithm execution is currently at a V node and the trace indicates that the program reads value 22 for the field of the V node, then the algorithm will descend to the subnode of the current V node that is reached by following the branch labelled with 22. The algorithm stops descending in the tree when the trace would lead to a subnode that is Ω. In this case, it extends tree with the outcome and remaining part of trace at the location of the Ω node that was found; by "remaining part of the trace," we mean the portion of the trace following the trace item that was reached while searching for the location at which to extend the tree; e.g., the remaining part of the trace is the value of trace.next in the algorithm when the algorithm reaches any of lines 2, 8, 15, or 25. In some embodiments, an exemplary algorithm referred to as "TraceToTree", presented in FIG. 8, may be used to convert a trace and final result to a linear tree containing only the given trace and outcome.

FIG. 9 illustrates an example applying a process of augmenting an initially empty tree. The first tree is simply Ω. The second tree results from augmenting the first with an execution that returns value 30 and produced trace Test (tcp_dst_port, 22, False), Read(eth_dst, 2). The augmentation replaces the root Ω node with a T node, filling in the t− branch with the result of converting the remaining trace after the first item into a tree using TraceToTree, and filling in the t+ branch with Ω. The third tree results from augmenting the second tree with an execution that returns value drop and produced the trace Test(tcp_dst_port, 22, False), Read (eth_dst, 4), Read(eth_src, 6). In this case, AugmentTT extends the tree at the V node in the second tree. Finally, the fourth tree results from augmenting the third tree with an execution that returns drop and results in the trace Test (tcp_dst_port, 22, True).

In certain embodiments, the TAPI may not support assertions on packet attributes, and the traces may consist of only the reads of attribute values. In this case, the trace tree model may be modified to omit T nodes. The resulting model may have lower fidelity than the trace tree model and may not afford compilation algorithms that take full advantage of hardware resources available of network elements. However, the inventors have appreciated that it may be appropriate in certain applications, since it may be possible to implement this model with lower storage requirements in the controller.

In certain embodiments, the TAPI may include methods to read network attributes such as topology information and/or host locations, by which we mean the switch and port at which a host connects to the network. In this case, the traces and the trace tree model can be enhanced to include these as attributes and to thereby encode a partial function on pairs of packets and environments. In one example, in some embodiments the TAPI may include the following API calls:

| readLocation | :: | (Env, Host) −> Loc |
| readHostPorts | :: | (Env, SwitchID) −> [PortID] |
| readTopology | :: | Env −> Topology |
| readMinHopPath | :: | (Env, Loc, Loc) −> Path |

Here, the notation [PortID] denotes a linked list of PortID values.

The detailed contents of the network state (e.g., the network attributes queried) and the API used to access it from an algorithmic policy may vary according specific embodiments of the invention. In one exemplary embodiment, the network attributes may include (1) the set of switches being controlled, (2) the set of directed links, in the form of a set of ordered pairs of switch-port identifiers, (3) the location (in the form of a switch-port identifier) of hosts in the network via an associative array that associates some hosts with a specific location, (4) and traffic statistics for each switch-port, for example in the form of a finite sequence of time-stamped samples of traffic counters including number of bytes and number of packets transmitted and received. In this embodiment, the algorithmic policy can invoke API functions, such as the following functions:

| Set<Link> links( ); |
| Set<SwitchID> switches( ); |
| Location hostLocation(Host h); | to access this information while determining how a packet should be processed. For example, topology information may be used for the computation of paths that packets should traverse. Various routing algorithms may be applied to a given topology, including shortest-path, equal-cost-shortest-paths, and/or widest-path routing.

Embodiments of the invention may vary in the technique(s) used to obtain such network state information. In one embodiment, the system may include an OpenFlow controller that issues requests for port statistics at randomized time intervals. In some embodiments, topology information (e.g., the set of links) may be determined by sending a "probe" packet (e.g., as an LLDP frame) on each active switch-port periodically. The probe packet may record the sender switch and port. Switches may be configured (e.g., via the control system) to forward probe packets to the controller in the form of packet-in messages. Upon receiving a probe packet, a switch may send the packet to the controller through a packet-in message which includes the receiving port. The controller may then observe the switch-port on which the probe was sent by decoding the probe frame and may determine the port on which the probe was received from the switch that generated the packet-in message and the incoming port noted in the packet-in message. These two switch-ports may then be inferred to be connected via a network link.

In other embodiments, network environment information may be provided by any suitable external component, given a suitable API to this external component. For example, the system could be applied to a network controlled by an OpenDaylight controller or a Floodlight controller, which may already include components to determine network topology and/or other information.

In some embodiments in which the policy depends on network state variables, the controller may keep the policy model as well as the rule sets in network elements up-to-date, so that stale policy decisions are not applied to packets after network state (e.g., topology) has changed. In some embodiments using the trace tree model, the model can be extended to explicitly record the dependencies of prior policy decisions on not only packet content but also on environment state such as network topology and/or configuration, providing information the controller may use to keep flow tables up-to-date. For example, the trace tree can be enhanced such that the attributes recorded at V and T nodes include network state attributes. When part of the network state changes, the controller may use its trace tree(s) to determine a subset of the distributed flow tables representing policy decisions that may be affected by state changes, and may invalidate the relevant flow table entries. The inventors have appreciated that it may be "safe" to invalidate more flow table entries than necessary, though doing so may impact performance. Some embodiments therefore may afford latitude with which to optimize the granularity at which to track environment state and manage consistency in the rule sets of network elements.

The inventors have recognized that merely caching prior policy decisions using trace trees may not make an SDN scalable if the controller still had to apply these decisions centrally to every packet. Real scalability may result when the controller is able to "push" many of these packet-level decisions out into the rule sets distributed throughout the OpenFlow-like network elements. Therefore, given the trace trees resulting from executing and analyzing policy executions, in some embodiments the dynamic optimizer may compute efficient rule sets for the network elements, and distribute these rules to the network elements.

Several methods of generating network element rule sets from trace trees are possible. In some embodiments, they may satisfy a requirement that if a packet is processed locally by a network element rule set—i.e., without consulting the controller—then the action performed on the packet is identical to the action recorded in the trace tree for the same packet.

We herein use the term "flow table" as a synonym for "rule set" and use the abbreviation "FT" to refer to a flow table. In some embodiments, an FT may be a partial mapping from priority levels to sets of disjoint rules, where a rule consists of a (match, action) pair and two rules are disjoint when their match conditions are. We denote the empty mapping as Ø. We use the notation p→{$r_1$, . . . $r_n$} to denote a partial map that maps priority p to the disjoint rule set {$r_1$, . . . , $r_n$} and all other priorities to the empty set. We define the union of two flow tables $ft_1$ and $ft_2$, written $ft_1$/±J $ft_2$ only when $ft_1$(p) and $ft_2$(p) are disjoint for all priorities p (two rules are disjoint when their match conditions are disjoint). In this case, we define the union to assign to each priority p the set $ft_1$(p)∪$ft_2$(p). We extend this definition to apply to several flow tables and write /±J {$ft_1$, . . . , $ft_n$} to denote the flow table $ft_1$/±J . . . /±J $ft_n$. An action in a rule is either a port identifier or the distinguished symbol ToController which denotes an action that, when performed, forwards the packet to the controller.

In some embodiments, forwarding on the basis of a FT ft may be performed by finding the lowest priority entry that applies to a packet and performing the specified action. If no action is found, the packet may be forwarded to the controller. We now formulate this more precisely as follows. The set of all triples (p, m, a) such that p→{$r_1$, . . . , $r_n$} is in FT and $r_i$=(m,a) for some i∈{1, . . . , n} is known as the "rule triples" in ft. A packet pkt is said to match in an FT ft at triple (p, m, a) in ft if m matches pkt as described earlier. A packet pkt is processed by FT ft with action a if there is a triple (p, m, a) in the rule triples of ft such that p is the least number among all numbers in the set {P'|(p', m, a)∈rule triples of ft} or if no such triple exists it is processed with action ToController.

Here we follow the opposite numerical priority ordering as OpenFlow protocols, which select rules with numerically higher priority before those with numerically lower priority. However, embodiments are not limited in this respect, and in some embodiments the buildFT algorithm may assign priorities in numerically descending rather than ascending order.

An exemplary buildFT algorithm is presented in FIG. 10. This example is a recursive algorithm that traverses the tree while accumulating a FT and maintaining a priority variable which is incremented whenever a rule is added to the FT. The variables holding the FT and priority are assumed to be initialized to Ø and to 0, respectively, before beginning. The exemplary algorithm visits the leaves of the tree, ensuring that leaves from $t_+$ subtrees are visited before leaves from $t_-$ subtrees, adding a prio→{(match, action)} entry to the accumulating FT for each leaf. As the algorithm descends down the tree, it accumulates a match value which includes all the positive match conditions represented by the intermediate tree nodes along the path to a leaf. Since negative matches are not supported directly in the match conditions, the exemplary algorithm ensures that any rule that may only apply when some negated conditions hold is preceded by other higher-priority rules that completely match the conditions that must be negated. We call such rules (that ensure that lower priority rules only match when a condition is negated) "barrier rules"; they are inserted at line 13 of the exemplary algorithm. To begin the process, we apply buildFT to a tree t and an empty match value.

A beneficial property of the exemplary buildFT algorithm is that its asymptotic time complexity is O(n), where n is the size of the tree, since exactly one pass over the tree is used.

We illustrate the operation of the buildFT algorithm on an example. We apply buildFT to the trace tree in the final trace of FIG. 9(d). The root of the tree is a T node, testing on TCP destination port 22. Therefore, the algorithm satisfies the condition in the if statement on line 9. Lines 10 and 11 then define a new match value m with the condition to match on TCP port 22 added. The algorithm then builds the table for the $t_+$ subnode in line 12 using the new match condition m. The $t_+$ branch is just a L node with drop action, therefore the resulting table will simply add a rule matching TCP port 22 with value drop to the end of the currently empty FT in line 4 and will increment the priority variable in line 5. The algorithm then returns to line 13 to add a barrier rule also matching TCP port 22, with action ToController and increments the priority variable in line 14. Then in line 15, the algorithm proceeds to build the table for the $t_-$ branch, with the original match conditions. The output for this example is the following FT:

{0→{(tcp_dst_port= 22, drop)},
1→{(tcp_dst_port = 22, ToController)},
2→{(eth_dst = 2, port(30))},
3→{(eth_dst = 4 ∧ eth_src = 6, drop)}}.

As noted above, the exemplary buildFT algorithm cannot place a negated condition such as tcp_dst_port≠22 in rules. Instead, it places a barrier rule above those rules that require such negation. The barrier rule matches all packets to port 22 and sends them to the controller. In this example, the barrier rule is unnecessary, but in general the matches generated for the $t_+$ subtree may not match all packets satisfying the predicate at the T node, and hence a barrier rule may be used. Exemplary algorithm buildFT conservatively always places a barrier rule; however, further algorithms may remove such unnecessary rules, as described further below.

The inventors have recognized that the selection and prioritization of rules for rule sets can impact the hardware resources required at network elements, e.g. table space required to represent rule sets, and hence the amount of recent policy information a switch can cache. Therefore, in some embodiments the dynamic optimizer can incorporate methods to select rules in order to optimize resource usage in network elements. In particular, some embodiments provide techniques that can be used by a dynamic optimizer to minimize the number of rules used in rule sets through element-local and/or global optimizations. Alternatively or additionally, the number of priority levels used may be minimized, which the inventors have appreciated may impact switch table update time. Previous studies have shown that update time is proportional to the number of priority levels. We now describe examples of such techniques.

Although buildFT is efficient and correct, the inventors have recognized that (1) it may generate more rules than necessary; and (2) it may use more priority levels than necessary. For example, consider the example buildFT compilation result discussed above. The barrier rule (the second rule) is not necessary in this case, since the first rule completely covers it. Moreover, observe that we can use fewer priorities; for example, the last two rules do not overlap and so there is no need to distinguish them with distinct priority levels. Combining these two observations, the following rule set would work to implement the same packet forwarding behavior:

$$\{0 \rightarrow \{(tcp\_dst\_port = 22, drop)\},$$
$$1 \rightarrow \{(eth\_dst = 2, port(30))\},$$
$$1 \rightarrow \{(eth\_dst = 4 \wedge eth\_src = 6, drop)\}\}.$$

The inventors have appreciated that reducing the number of rules used may be beneficial, because rules are often implemented in Ternary Content Addressable Memory (TCAMs) (see K. Pagiamtzis and A. Sheikholeslami, "Content-addressable memory (CAM) circuits and architectures: A tutorial and survey," IEEE Journal of Solid-State Circuits, vol. 41, no. 3, pp. 712-727, March 2006), and space available in TCAMs may be limited. The inventors have also appreciated that reducing the number of priority levels may be beneficial because the best algorithms for TCAM updates have time complexity O(P) where P is the number of priority levels needed for the rule set (D. Shah and P. Gupta, "Fast Updating Algorithms for TCAMs", IEEE Micro, January 2001, 21, 1, 36-47). Therefore, the inventors have appreciated that reducing the number of priority levels can reduce the time required to perform rule set updates in network elements. Hence, certain embodiments include methods of generating rule sets that minimize the number of rules and/or priorities used and which can be used in place of buildFT.

We specify the exemplary optBuildFT algorithm using the attribute grammar formalism, introduced in D. E. Knuth, "Semantics of Context-Free Languages", Mathematical Systems Theory, 2, 2, 1968, 127-145 (and further described in Paakki, J, "Attribute grammar paradigms—a high-level methodology in language implementation", ACM Comput. Surv, June 1995, 27, 2, 196-255), a formalism frequently used to describe complex compilation algorithms. Each of the foregoing references is incorporated herein by reference in its entirety. In this formalism, we view a trace tree as an element of a context-free grammar, we specify a collection of variables associated with elements of the grammar, and we specify the equations that each variable of a grammar element must satisfy in terms of variables of parent and children nodes of the node to which a variable belongs. Further details of the attribute grammar formalism can be found in the literature describing attribute grammars.

Some embodiments may apply this formalism by defining the trace trees with a context-free grammar. FIG. 11 specifies exemplary production rules for a context-free grammar for trace trees. This example leaves some non-terminals, e.g. Attr unspecified, as these are straightforward and their precise definition does not fundamentally alter the method being described.

Some embodiments may then introduce additional quantities at each node in the trace tree, such that these quantities provide information to detect when rules are unnecessary and when new priority levels are needed. In particular, for each node node in the tree or at the root, some embodiments may calculate the following exemplary quantities:

node.comp Synthesized Boolean-valued attribute indicating that the node matches all packets, i.e. it is a complete function.

node.empty Synthesized Boolean-valued attribute indicating that the node matches no packets, i.e. it is equivalent to $\Omega$.

node.mpu Synthesized integer-valued attribute indicating the maximum priority level used by node.

node.mch Inherited attribute consisting of the collection of positive match conditions which all packets matching in the subtree must satisfy.

node.ft The forwarding table calculated for the node. The value of this variable at the root of the trace tree is the overall compilation result.

node.pc Inherited attribute consisting of the priority constraints that the node must satisfy. The priority constraints are a list of pairs consisting of (1) a condition that occurs negated in some part of the tree and (2) the priority level such that all priorities equal to or greater are guaranteed to match only if the negation of the condition holds.

FIG. 12 lists exemplary equations that may be used in some embodiments for the variables at each node in terms of the variables at the immediate parent or children of the node. For example, Equation 27 states that a barrier rule is only needed in a T node if both the positive subtree ($t_+$) is incomplete and the negated subtree ($t_-$) is not empty. This equation eliminates the unnecessary barrier in our running example, since in our example the positive subtree completely matches packets to tcp port 22.

The exemplary equations in FIG. 12 make use of three auxiliary functions, whose straight-forward definitions we omit, since a skilled practitioner can easily provide implementations of them. In particular, maxPrio(pc) returns the maximum priority included in a set of priority constraints pc. addMch((a, v), m) appends a field condition specified by attribute a and value v to a match m. addPC ((p, a, v), pc) adds a priority constraint specified by priority p, attribute a, and value v to priority constraint pc.

Priority constraint (pc) variables: The (pc) variable at each node contains the context of negated conditions under which the rule is assumed to be operating. Along with each negated condition, it includes the priority level after which the negation is enforced (e.g. by a barrier rule). The context of negated conditions is determined from the top of the tree downward. In particular, the pc values of the T and V subtrees are identical to their parent node values, with the exception of the $t_-$ subtree, which includes the negated condition in the parent node. In this way, only T nodes increase the number of priority levels required to implement the flow table. In particular, V nodes do not add to the pc of their subtrees.

Finally, the pc value is used in the L and $\Omega$ nodes which take the maximum value of the priority levels for all negated conditions which overlap its positive matches. This is safe, since the priority levels of disjoint conditions are irrelevant. It is also the minimal ordering constraint since any overlapping rules must be given distinct priorities.

The inventors have appreciated that the exemplary compilation algorithm just specified may allow the compiler to achieve optimal rule sets for algorithmic policies performing longest IP prefix matching, an important special case of algorithmic policy. We demonstrate this with the following example. Consider an algorithmic policy that tests membership of the IP destination of the packet in a set of prefixes and that it tests them in the order from longest prefix to shortest. Suppose the set of prefixes and output actions are as follows:

| | |
|---|---|
| 103.23.3/24 | --> a |
| 103.23/16 | --> b |
| 101.1/16 | --> c |
| 101.20/13 | --> d |
| 100/9 | --> e |

Although the tests nodes add priority constraints for each prefix, the final leaf nodes remove constraints due to disjoint prefixes. This allows the compiler to achieve the optimal priority assignment:

| 0, 103.23.3/24 | --> a |
| 0, 101.1/16 | --> c |
| 1, 103.23/16 | --> b |
| 1, 101.20/13 | --> d |
| 1, 100/9 | --> e |

The solutions to the equations listed in FIG. 12 for any particular trace tree can be algorithms. Some exemplary embodiments may utilize a solver (i.e. an algorithm for determining the solution to any instance of these equations) for this attribute grammar using a functional programming language with lazy graph reduction. In some embodiments, the solver may compute values for all variables with a single pass over the trace trace, using a combination of top-down and bottom-up tree evaluation and the time complexity of the algorithm is therefore linear in the size of the trace tree.

In certain embodiments, the algorithmic policy may depend on some database or other source of information which the controller has no knowledge of. In other words, the database may be maintained by some external entity. For example, the forwarding policy that should be applied to packets sent by a particular endpoint may depend on the organizational status of the user who is operating the endpoint; for example, in a campus network, the forwarding behavior may depend on whether the user is a registered student, a guest, or a faculty member. Other external data sources may include real clock time.

When the algorithmic policy depends on external state, in some embodiments the program f written by the user may represent a function of the following form:

f::(Packet, Env, State)->ForwardingPath

In this example, f takes as inputs a packet header, an environment parameter that contains information about the state of the network, including the current network topology, the location of hosts in the network, etc. and a user-defined state component that provides f with external sources of information relevant to determining the forwarding policy.

Figures 13, 14:
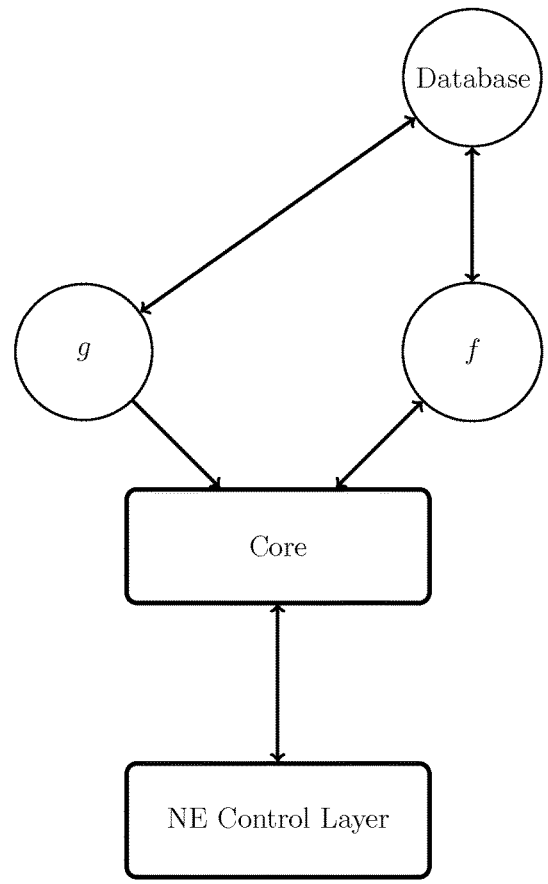
FIG. 13 is a drawing of exemplary components of a network system in which an algorithmic policy references an external database, in accordance with some embodiments; g is an invalidator component, while all other elements are as listed with reference to FIG. 3.
FIG. 14 illustrates exemplary steps to reduce the length of traces produced from executing an algorithmic policy in accordance with some embodiments, using the compressTrace algorithm.

In some embodiments in which the policy uses an external database, an indication may be made to the system that a change to the external state has occurred and to indicate the particular subset of the inputs to the policy on which the policy may make decisions differently as a result of this changed external state. FIG. 13 depicts an exemplary arrangement of components in accordance with one or more embodiments, wherein the user-defined algorithmic policy depends on external sources of information. FIG. 13 depicts a database component and indicates that both the algorithmic policy (f) and an invalidator component (g) communicate with the database. The invalidator component may be an arbitrary program, running independently of the core, that notifies the core that the output of the algorithmic policy may have changed for some particular portion of inputs. The invalidation messages may take different forms and meanings in various embodiments. In some embodiments, the invalidation message indicates invalidation criteria that identify which execution traces should be invalidated. In one embodiment, the system may receive invalidations which identify a subset of packets based on their packet attributes using match conditions, and which identify executions which could have received packets in the given subset of packets. In another embodiment, the invalidation message may indicate a prefix of an execution trace such that recorded execution traces that extend the specified execution trace prefix should be invalidated.

In some embodiments, when an invalidation command is received, the system may immediately remove recorded executions that satisfy the invalidation criteria and update the forwarding element configurations to be consistent with the updated set of recorded executions.

In some embodiments, where the user-defined algorithmic policy requires access to state components other than those included in the system-provided environment component, the algorithmic policy TAPI may be enhanced with to allocate state components, in the form of instances of various mutable data structures that can be updated by user-defined program logic at runtime. These data structures may include, e.g., variables, finite sets, and/or finite associative arrays. In such embodiments, the TAPI may permit the policy to read and update state components using data-structure-specific operations, such as read and write for variables, membership test, insert and/or delete for sets, and/or key membership, key-based value lookup, insert and/or delete in associative arrays.

In some embodiments in which the TAPI is enhanced with mutable data structures, the tracing runtime may be enhanced to automatically invalidate recorded executions which become invalid due to changes in the instances of mutable data structures used in a user-defined algorithmic policy. In some embodiments, the tracing runtime may be enhanced to trace operations on mutable data structure instances. The tracing runtime may build a data structure referred to herein as a "dependency table", that records, for each state component, the currently recorded executions that accessed the current value of that state component. In some embodiments, the system may intercept state-changing operations on program state components and automatically invalidate any prior recorded executions which depended on the state components changed in the operation.

In some embodiments, the TAPI may ensure that the effects of state-changing operations performed by user-defined algorithmic policies upon application to certain packets occur, even when rules are generated for such executions. In some embodiments, the system may avoid installation of forwarding rules that would prevent the execution of the controller-located algorithmic policy on specific packets, if executing the policy on those packets would change some state components. Thus, in some embodiments, the tracing runtime may be enhanced to detect when executions are idempotent on a class of packets and in a given state, where an execution is idempotent on a class of packets in a given state if executing it again in the given state on any packet in the class of packets would not change the given state. An algorithm which performs this task in the tracing runtime is referred to herein as the "idempotent execution detection algorithm."

In some embodiments, the tracing runtime system may delay update of the forwarding element configurations after an update to state components that invalidates some prior recorded executions, and may instead apply a technique referred to herein as "proactive repair". Using proactive repair, in some embodiments the system may enhance the recorded execution, by additionally recording the packet used to generate the execution. When an update to state components occurs, the dependency table may be used to locate the recorded executions that may be invalidated. These identified executions may be removed from the set of recorded executions. The system may then reevaluate the user-defined algorithmic policy on the packets associated with the identified executions to be invalidated. Each reevaluated execution which does not change system state may then be recorded as a new execution. Finally, the system may execute commands on the forwarding elements in order to update their forwarding configurations to be consistent with the resulting recorded executions after both removing the invalidated executions and recording the non-state changing reevaluated executions.

In some embodiments using the "proactive repair" technique, when a state changing event occurs, the system may apply a rule update minimization algorithm to compute the minimal update required to update the forwarding element configurations from their current state to their final state after proactive repair. For example, suppose the system is in state with flow tables F. When a state change occurs, invalidation of recorded executions and proactive repair may produce a sequence of flow table updates $U_1, \ldots, U_n$, $U_1', \ldots, U_m'$ where $U_i$ are changes due to removal of non-cacheable traces from the trace tree and $U_j'$ are changes due to the addition of newly cacheable traces resulting from proactive repair. The final result of applying these state changes may be a new collection of flow tables F'. In the case where most flows are unaffected, F' may be very similar to F, even though there may be many changes contained in $U_1, \ldots, U_n, U_1', \ldots, U_m'$. The inventors have recognized that naively executing each of these flow table changes to move the system to flow tables F' may become a substantial bottleneck, since currently available hardware OpenFlow switches process fewer than 1000 flow table updates per second (see Charalampos Rotsos, Nadi Sarrar, Steve Uhlig, Rob Sherwood, and Andrew W. Moore. OFLOPS: An Open Framework for OpenFlow Switch Evaluation. In *Proceedings of the* 13*th International Conference on Passive and Active Measurement*, PAM' 12, pages 85-95, Berlin, Heidelberg, 2012. Springer-Verlag.)

Rather than actually apply all the changes specified by the updates, in some embodiments the system using update repair may apply a technique referred to herein as update minimization to execute the minimum number of updates required to move update flow tables from F to F'. For example, let F consist of rules $r_i=(p_i, m_i, a_i)$, for $i \in I$ where $p_i$ is rule priority, $m_i$ is the rule match condition, $a_i$ is the rule action. Similarly, let F' be $r_j'=(p_j', m_j', a_j')$, for $j \in J$.

Then the minimal collection of updates may be as follows:

Delete $r_i$, when $\neg \exists j: p_i=p_j' \wedge m_i=m_j'$

Insert $r_j'$, when $\neg \exists i: p_i=p_j' \wedge m_i=m_j'$

Modify $r_i$ to action $a_j'$, when $\exists j: p_i=p_j' \wedge m_i=m_j' \wedge$ not ($a_i=a_j$)

This can be seen to be a minimal update since any updates that result in a rule with a priority and match that were not used in F' must accomplish this through at least one insert. Likewise, a rule in F such that no rule in F' has the same priority and match must have been removed through at least one deletion. Rules with same priority and match but different action require at least one modification or at least one deletion and one insertion.

In some embodiments, the update minimization can be achieved using the exemplary cancelUpdates algorithm, shown in FIG. 22. This exemplary algorithm calculates the above minimum update using a linear $O(\text{Sum}|U_i|+\text{Sum}|U_j'|)$ time. To specify the algorithm, we first define some notation. Each update $U_i$ and $U_j'$ consists of a sequence of changes where each change has two components: c.type, which is one of the update type constants Insert, Delete, Modify, and c.rule which is an OpenFlow rule. Note that the updates produced by the trace tree operations (remove trace and augment) generate a sequence of inserts and deletions (i.e. no modifications) with no consecutive inserts (or deletes) of rules with the same priority and match. We let $\{c_1, \ldots, c_k\}$ be the sequence that results from concatenating the changes of $U_1, \ldots, U_n, U_1', \ldots, U_m'$ in order. The cancelUpdates algorithm computes a dictionary, z, mapping pairs (p, m) of priority p and match m to a triple (t, a, a0) where t is the update type, a is the action to use in the final modify or update command and a0 is the action that the rule had in the initial rule set F in the case that there was a rule with priority p and match m in F. The only rules that need to be updated are the ones with entries in z. The algorithm makes a single pass over $\{c_1, \ldots, c_k\}$ in order. For each (p, m), it processes alternating insertions and deletions (if no rule with (p, m) is in F) or alternating deletions and insertions (if a rule with (p,m) is in F). If the algorithm encounters a change with (p,m) not in z, then it adds the change to z. In addition, if the type is Delete, then a rule existing in F is being deleted (since, given the meaning of z, no change has been made to a (p, m) rule yet), so the action is the action of the rule in F and the algorithm saves the action in the triple added to z. Otherwise, the algorithm has already saved a change to the rule with (p, m) and it updates the change as appropriate. For example, if c inserts a rule that was previously deleted and the inserted rule has an action that differs from the initial action in F, then the algorithm applies a modification. On the other hand, if the inserted rule has the same action as the initial action in F, the algorithm removes the change, since no changes need to be made to F in this case. The other cases follow from similar reasoning.

Although the number of distinct observations that a program f can make of the packet header may be finite, a program may repeatedly observe or test the same attribute (field) of the packet header, for example during a loop. This can result in a large trace. Therefore, certain embodiments may use a technique for reducing the length of traces produced from executions of an algorithmic policy by the tracing runtime system. For example, some embodiments may utilize a method referred to as "CompressTrace" which eliminates both read and test redundancy. This exemplary method implements the following mathematical specification. Consider a non-reduced trace t consisting of entries $e_1 \ldots e_n$. For any trace entry e accessing information about attribute a let range(e) denote the set of values for attribute a consistent with e. For example, if e consists of a false assertion that the tcp destination port attribute equals 22, then range(e) is the set of all tcp port values, except for 22. Further define knownRange$_a$(0)=dom($a$), for all attributes $a$ knownRange$_a$($i$+1)=knownRange$_a$($i$)∩range($e_{i+1}$), for all attributes $a$ and $i \in \{1 \ldots n-1\}$.

Finally, define the reduced trace t' to be the subsequence of t such that if knownRange$_a$($i$+1)=knownRange$_a$($i$) for all attributes a, then $e_{i+1}$ is not a member of t'. The exemplary algorithm CompressTrace, presented in FIG. 14, may be used in some embodiments to compute a reduced trace according to this specification. Those skilled in the art should readily appreciate how this algorithm can be adapted to run as the trace log is gathered, rather than after the fact.

As used herein, an "incremental algorithm" is an algorithm that maintains a correspondence between one data structure, the "target", in correspondence with another data structure, the "source", when the source undergoes a sequence of changes, such that the change in the target is calculated from the change to the source. We can state this informal notion of an incremental algorithm more precisely as follows. Let S and T be "source" and "target" sets respectively and h:S→T be a function from S to T known as the "correspondence". $S_\Delta$ is a subset of the set of functions S→S known as the "delta" set. An incremental algorithm for source S, target T, correspondence h and source changes $S_\Delta$ consists of an algorithm that (given appropriate representations of each of the input sets and functions) implements a function w:(S×$S_\Delta$×T)→T such that for any $S_0 \in S$ and sequence $\delta_0 \ldots \delta_{n-1}$ of elements of $S_\Delta$, we have $t_i$=h($s_i$) for all i∈{0, 1, ... n} where $t_0$=h($s_0$), $S_{i+1}$=$\delta_i$($S_i$) and $t_{1+1}$=w($s_i$, $\delta_i$, $t_i$), Certain embodiments may use incremental algorithms to calculate rule set updates from model updates. More precisely, in some embodiments the source set may be the set of (some variant of) trace trees, the target set may include the collection of rule sets of network elements, the delta set may include pairs of traces and outcomes, and the correspondence may be (some variant of) a compilation function from trace trees to rule sets. Various embodiments may use different incremental algorithms, including, in some embodiments, incremental algorithms that maintain the same relationship between the rule set and the trace tree as the OptBuildFT algorithm.

In one embodiment, the incremental algorithm presented in FIG. 15 may be used. This exemplary algorithm avoids recompilation in the case that a trace augments the trace tree at a V node and the mpu variable of the V node is unchanged by the augmentation. In this case, the inventors have appreciated that the only modification of the rule set is the addition of a small number of rules, directly related to the trace being inserted and that no other rules are altered. In this case, the method may simply update the rule set with the new rules needed for this trace. It is possible to devise more sophisticated incremental algorithms that perform localized updates in more general cases.

Any of the aforementioned methods of determining rule sets from policy models (including those based on trace tree models) may use the same process to produce a forwarding table for each switch. However, the inventors have recognized that switches in a network are connected in a particular topology and a packet traversing switches is processed by a particular sequence of switches which essentially form a pipeline of packet processing stages. Some embodiments may take advantage of this extra structure to substantially optimize the rule tables in the network by dynamically partitioning the packet processing responsibilities among different switches.

We apply this insight to the following problem. The flow tables we generate in some embodiments may be required to implement two functions: (1) forward flows whose route is known and (2) pass packets which will pass through unknown parts of the trace tree back to the controller. In some embodiments, the packet processing feature can be partitioned among the switches by ensuring that function (2) is enforced on the first hop of every path, i.e. at edge ports in the network. The inventors have appreciated that if this is maintained, then forwarding tables at internal switches may only implement function (1).

Certain embodiments may take advantage of this insight by using the "CoreOptimize" algorithm in the dynamic optimizer. This exemplary algorithm, presented in FIG. 16, reduces the size of rule sets at many network elements. The algorithm may be applied to the core rule set of a network element, by which we mean the subset of the rule set of a network element that applies to packets arriving on ports which interconnect the network element with other network elements (as opposed to connecting the network element with endpoints). The exemplary algorithm first removes all rules forwarding to the controller. It then attempts to encompass as many rules as possible with a broad rule that matches based on destination only. The inventors have recognized that the deletion of rules that forward to controller may allow for agreement to be found among overlapping rules.

The inventors have appreciated that the aforementioned exemplary algorithm may not alter the forwarding behavior of the network because the only packets that may be treated differently are those which are forwarded to the controller at an edge port in the network by virtue of the rule sets generated by correct compilation algorithms not using the CoreOptimize algorithm. Therefore, such packets may never reach a network element where it is processed by a core network rule without being sent to the controller first, thus achieving desired behavior.

This exemplary algorithm optimizes for the common case that forwarding of packets is based primarily on the destination. The inventors have appreciated that this is likely to be important in core switches in the network, which must process many flows and where rule space is a more critical resource. The inventors have further appreciated that the exemplary algorithm has the advantage that this table compression may be implemented automatically, and applies just as well to shortest path routing as to other routing schemes. In fact, it may apply well even when there are exceptions to the rule for various destinations, since even in that case it may be possible to cover many rules, up to some priority level.

The inventors have further appreciated that the exemplary algorithm can be implemented efficiently. Each of the steps in the CoreOptimize algorithm can be performed in O(|n|) time where n is the number of rules in the rule set provided as input to the algorithm.

The inventors have implemented the algorithms described in the present invention and have evaluated example networks with various algorithmic policies using techniques described herein. The inventors have implemented the TAPI, the dynamic modeler and optimizer the control protocol layer entirely in Haskell, a high-level functional programming language with strong support for concurrency and parallelism. The implemented control protocol layer includes a complete implementation of the OpenFlow 1.0 specification (the specification is available at www.openflow.org/documents/openflow-spec-v1.0.0.pdf).

The evaluation OpenFlow controllers were run on an 80 core SuperMicro server, with 8 Intel Xeon E7-8850 2.00 GHz processors, each having 10 cores with a 24 MB smart cache and 32 MB L3 cache. Four 10 Gbps Intel network interface controllers (NICs) were used. The server software includes Linux Kernel version 3.7.1 and Intel ixgbe drivers (version 3.9.17). Both real network elements as well as an OpenFlow network simulator based on cbench (www.openflow.org/wk/index.php/Oflops), a well-known benchmarking program for OpenFlow controllers, were used.

To evaluate the optimizer, cbench was extended with a simple implementation of a switch flow table, using code from the OpenFlow reference implementation. cbench was modified to install rules in response to flow modification commands from controllers, to forward packets from simulated hosts based on its flow tables. The program was instituted to collect statistics on the number of flow table misses and flow table size over time.

The optimizer was evaluated with three HP 5406zl switches implementing the OpenFlow 1.0 protocol. These switches were placed in a simple linear topology with no cycles.

Multiple algorithmic policies have been implemented. In the evaluations, we focus on the layer 2 learning controller. The layer 2 ("L2") learning controller is an approximation (in the context of OpenFlow) of a traditional Ethernet using switches which each use the Ethernet learning switch algorithm. In such a controller each switch is controlled independently. Locations for hosts are learned by observing packets arriving at the switch and forwarding rules are installed in switches when the locations of both source and destination for a packet are known by the controller from the learning process. Using this controller allows us to compare both optimizer techniques as well as runtime system performance in comparison with other available controller frameworks, all of which include an equivalent of a layer 2 learning controller implementation.

For the simulated optimizer evaluations, cbench was modified to generate traffic according to key statistical traffic parameters, such as flow arrival rate per switch, average flow duration, number of hosts per switch and distribution of flows over hosts and applications.

Two experiments were performed to evaluate the optimizer. In the first experiment, we measure the packet miss rate, i.e. the probability that a packet arriving at a switch fails to match in the switch's flow table. This metric strongly affects latency experienced by flows in the network, since such packets incur a round trip to the controller.

Two controllers were compared, both implementing layer 2 learning. The first controller, which we refer to as "Exact", is written as a typical naive Openflow controller using exact match rules and built with the Openflow protocol library used by the overall system. The second controller, which we refer to as "AlgPolicyController" is written as an algorithmic policy and uses the optimizer with incremental rule updates to generate switch rules.

Figure 17:
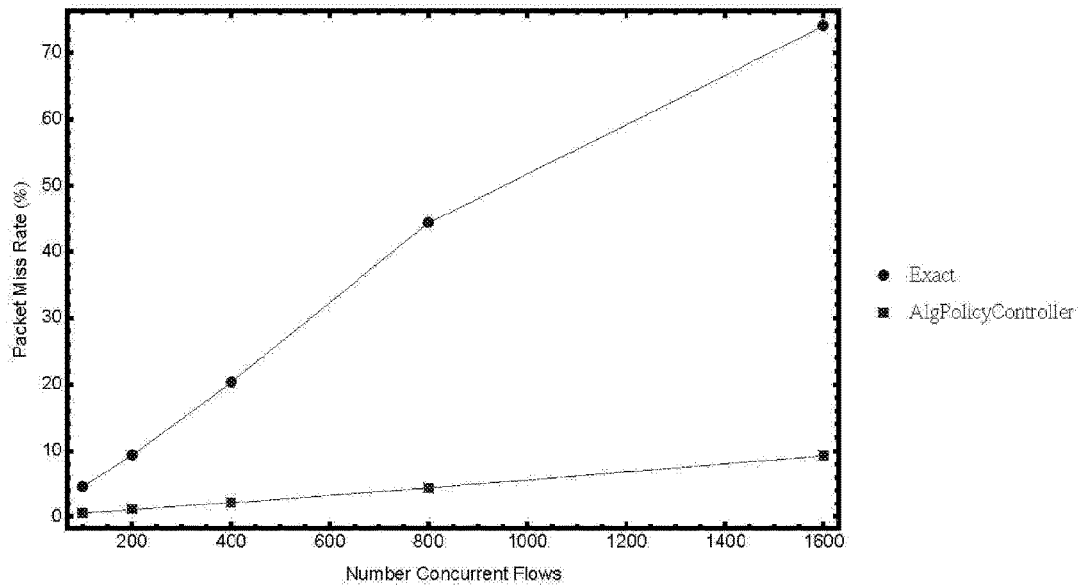
FIG. 17 shows exemplary graphs of the mean packet miss rate as a function of the number of concurrent flows for a hand-optimized controller, whose graph is labelled "Exact", and a controller expressed using an algorithmic policy and executed using methods of some embodiments, whose graph is labelled "AlgPolicyController"
Figure 18:
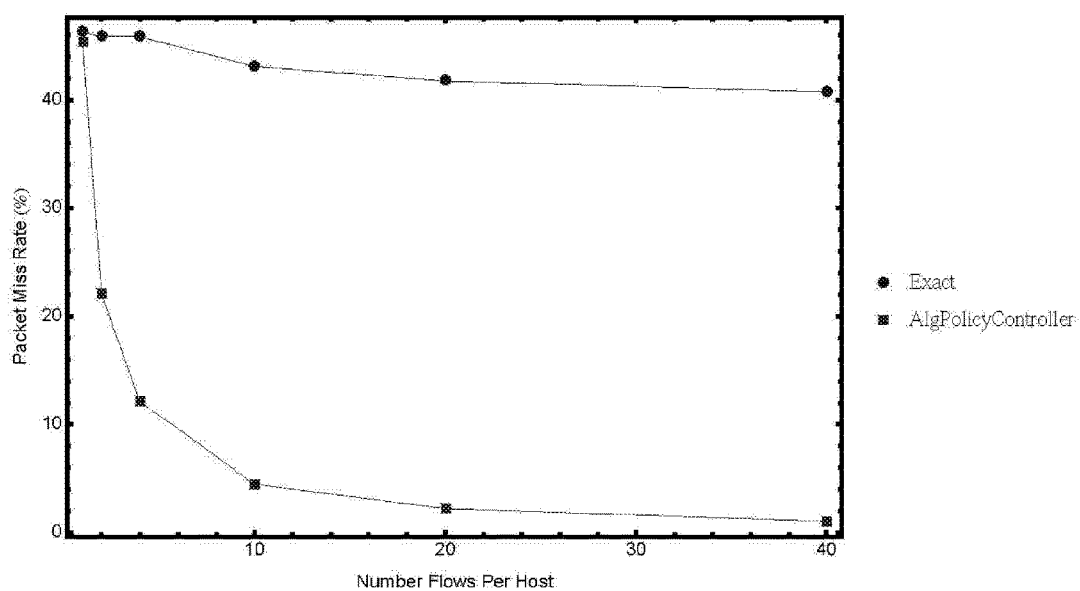
FIG. 18 shows exemplary graphs of the mean packet miss rate as a function of the number of concurrent flows per host for a hand-optimized controller, whose graph is labelled "Exact", and a controller expressed using an algorithmic policy and executed using methods of some embodiments, whose graph is labelled "AlgPolicyController"

FIG. 17 compares the packet miss rate as a function of the number of concurrent flows at a switch. The measurement was taken using the extended cbench with an average of 10 flows per host, 1 second average flow duration and 1600 packets generated per second. In both cases, the miss rate increases as the number of concurrent flows increases, since the generated packets are increasingly split across more flows. However, the AlgPolicyController dramatically outperforms the hand-written exact match controller. In particular, the AlgPolicyController automatically computes wildcard rules that match only on incoming port and source and destination fields. The system therefore covers the same packet space with fewer rules and incur fewer cache misses as new flows start. FIG. 18 compares the packet miss rate as a function of the number of concurrent flows per host. Again, the algorithmic policy substantially outperforms the exact match controller.

In the second experiment we measure time to establish a number of TCP connections between hosts on either end of a line of 3 HP 5406 Openflow switches. We perform the measurement using httperf (Mosberger, D and Jin, T., "httperf a tool for measuring web server performance", SIGMETRICS Perform. Eval. Rev., December 1998, 26, 3, pp. 31-37). We use essentially the same two controllers as before, but modify them to use only IP matching fields in order to accommodate the switches' restrictions on which flows can be placed in hardware tables. In this case, we perform learning and routing based on IP addresses and interpret an exact match as being exact on IP fields.

Figure 19:
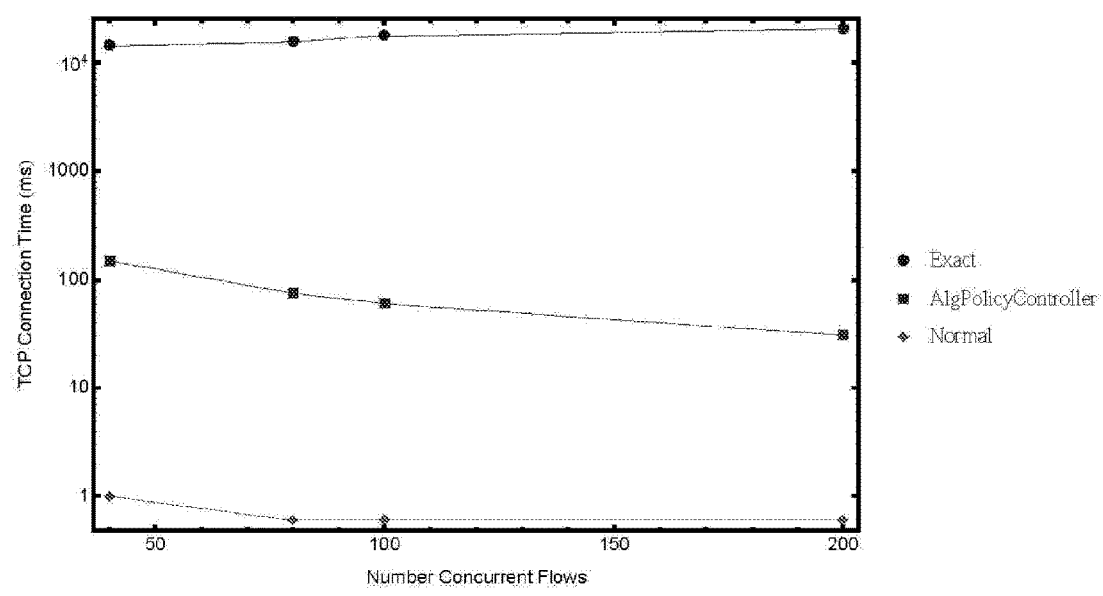
FIG. 19 shows an exemplary graph of the mean time to establish a TCP connection as a function of the number of concurrent TCP connections initiated using a network with three HP 5406 OpenFlow switches for a hand-optimized controller, whose graph is labelled "Exact", a controller expressed using an algorithmic policy and executed using methods of some embodiments, whose graph is labelled "AlgPolicyController", and a traditional (i.e., non-OpenFlow-based) hardware implementation, whose graph is labelled "Normal"

For comparison, we also measure the same metric when used with the ordinary L2 function of the switches. FIG. 19 shows the mean connection time as a function of the number of concurrent connections initiated, with the y-axis on a log scale. The average connection time for the exact match controller is roughly 10 seconds, 100 times as long as with AlgPolicyController. The native L2 functionality performs much better, with average connection time around 0.5 ms, indicating the overheads associated with OpenFlow on this line of switches. The surprisingly slow connection time in this evaluation highlights how the need to configure a sequence of switches on a path (3 in this case) dramatically decreases performance, and underscores the importance of reducing the number of misses in the flow tables as networks scale up.

Figure 20:
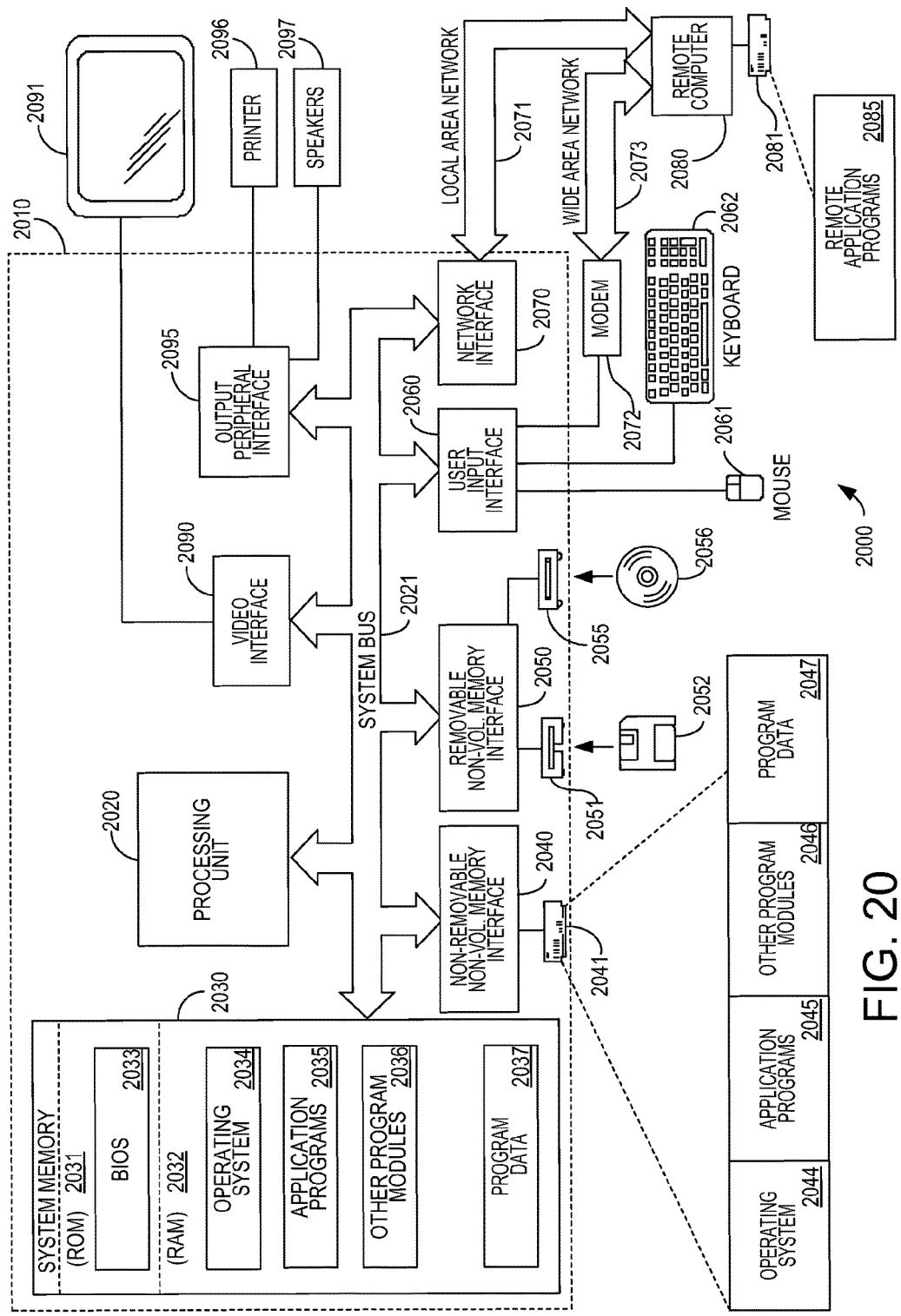
FIG. 20 is a schematic diagram of an exemplary computing environment in which some embodiments may be implemented.

FIG. 20 illustrates an example of a suitable computing system environment 2000 in which some embodiments may be implemented. This computing system may be representative of a computing system that allows a suitable control system to implement the described techniques. However, it should be appreciated that the computing system environment 2000 is only one example of a suitable computing environment and is not intended to suggest any limitation as to the scope of use or functionality of the described embodiments. Neither should the computing environment 2000 be interpreted as having any dependency or requirement relating to any one or combination of components illustrated in the exemplary operating environment 2000.

The embodiments are operational with numerous other general purpose or special purpose computing system environments or configurations. Examples of well-known computing systems, environments, and/or configurations that may be suitable for use with the described techniques include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in both local and remote computer storage media including memory storage devices.

With reference to FIG. 20, an exemplary system for implementing the described techniques includes a general purpose computing device in the form of a computer 2010. Components of computer 210 may include, but are not limited to, a processing unit 2020, a system memory 2030, and a system bus 2021 that couples various system components including the system memory to the processing unit 2020. The system bus 2021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2010 typically includes a variety of computer readable media. Computer readable media can be any available media that can be accessed by computer 2010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 2030 includes computer storage media in the form of volatile and/or nonvolatile memory such as read only memory (ROM) 2031 and random access memory (RAM) 2032. A basic input/output system 2033 (BIOS), containing the basic routines that help to transfer information between elements within computer 2010, such as during start-up, is typically stored in ROM 2031. RAM 2032 typically contains data and/or program modules that are immediately accessible to and/or presently being operated on by processing unit 2020. By way of example, and not limitation, FIG. 20 illustrates operating system 2034, application programs 2035, other program modules 2036, and program data 2037.

The computer 2010 may also include other removable/non-removable, volatile/nonvolatile computer storage media. By way of example only, FIG. 20 illustrates a hard disk drive 2041 that reads from or writes to non-removable, nonvolatile magnetic media, a magnetic disk drive 2051 that reads from or writes to a removable, nonvolatile magnetic disk 2052, and an optical disk drive 2055 that reads from or writes to a removable, nonvolatile optical disk 2056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2041 is typically connected to the system bus 2021 through a non-removable memory interface such as interface 2040, and magnetic disk drive 2051 and optical disk drive 2055 are typically connected to the system bus 2021 by a removable memory interface, such as interface 2050.

The drives and their associated computer storage media discussed above and illustrated in FIG. 20 provide storage of computer readable instructions, data structures, program modules and other data for the computer 2010. In FIG. 20, for example, hard disk drive 2041 is illustrated as storing operating system 2044, application programs 2045, other program modules 2046, and program data 2047. Note that these components can either be the same as or different from operating system 2034, application programs 2035, other program modules 2036, and program data 2037. Operating system 2044, application programs 2045, other program modules 2046, and program data 2047 are given different numbers here to illustrate that, at a minimum, they are different copies. A user may enter commands and information into the computer 2010 through input devices such as a keyboard 2062 and pointing device 2061, commonly referred to as a mouse, trackball or touch pad. Other input devices (not shown) may include a microphone, joystick, game pad, satellite dish, scanner, touchscreen, or the like. These and other input devices are often connected to the processing unit 2020 through a user input interface 2060 that is coupled to the system bus, but may be connected by other interface and bus structures, such as a parallel port, game port or a universal serial bus (USB). A monitor 2091 or other type of display device is also connected to the system bus 2021 via an interface, such as a video interface 2090. In addition to the monitor, computers may also include other peripheral output devices such as speakers 2097 and printer 2096, which may be connected through an output peripheral interface 2095.

The computer 2010 may operate in a networked environment using logical connections to one or more remote computers, such as a remote computer 2080. The remote computer 2080 may be a personal computer, a server, a router, a network PC, a peer device or other common network node, and typically includes many or all of the elements described above relative to the computer 2010, although only a memory storage device 2081 has been illustrated in FIG. 20. The logical connections depicted in FIG. 20 include a local area network (LAN) 2071 and a wide area network (WAN) 2073, but may also include other networks. Such networking environments are commonplace in offices, enterprise-wide computer networks, intranets and the Internet.

When used in a LAN networking environment, the computer 2010 is connected to the LAN 2071 through a network interface or adapter 2070. When used in a WAN networking environment, the computer 2010 typically includes a modem 2072 or other means for establishing communications over the WAN 2073, such as the Internet. The modem 2072, which may be internal or external, may be connected to the system bus 2021 via the user input interface 2060, or other appropriate mechanism. In a networked environment, program modules depicted relative to the computer 2010, or portions thereof, may be stored in the remote memory storage device. By way of example, and not limitation, FIG. 20 illustrates remote application programs 2085 as residing on memory device 2081. It will be appreciated that the network connections shown are exemplary and other means of establishing a communications link between the computers may be used.

Figure 21:
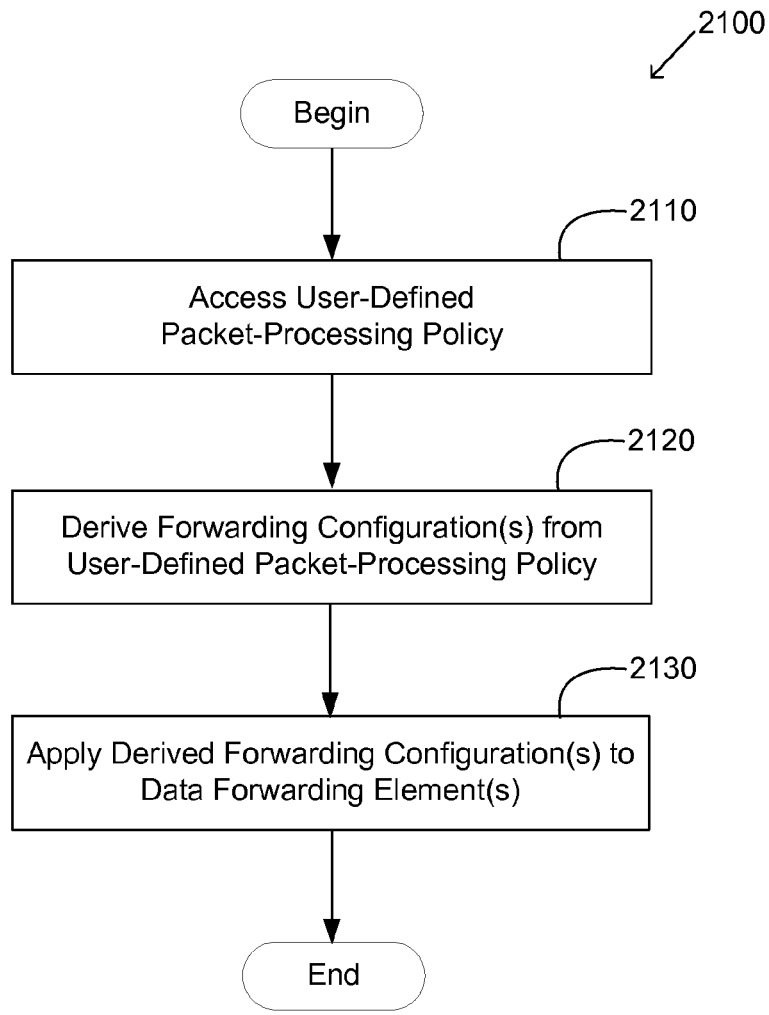
FIG. 21 is a flow chart illustrating an exemplary method for managing forwarding configurations in accordance with some embodiments.

It should be appreciated from the foregoing that one embodiment is directed to a method 2100 for managing forwarding configurations in a data communications network including data forwarding elements each having a set of forwarding configurations and being configured to forward data packets according to the set of forwarding configurations, as illustrated in FIG. 21. Method 2100 may be performed, for example, by one or more components of a control system for the data communications network, such as one or more controllers, which may be implemented in some embodiments as one or more control servers. Method 2100 begins at act 2110, at which a user-defined packet-processing policy may be accessed at the controller. The packet-processing policy may be defined by the user in a general-purpose programming language, and may specify how data packets are to be processed through the data communications network via the at least one controller. As discussed above, in some embodiments the packet-processing policy may be an algorithmic policy.

At act 2120, one or more forwarding configurations for one or more data forwarding elements in the data communications network may be derived from the user-defined packet-processing policy. This may be done using any suitable technique(s); examples of suitable techniques are discussed above. In some embodiments, deriving the forwarding configuration(s) may include deriving one or more forwarding rules for the data forwarding element(s). As discussed above, a forwarding rule may specify one or more characteristics of data packets to which the forwarding rule applies (e.g., a match condition), and may specify how the data forwarding element is to process data packets having those characteristics (e.g., an action). In some cases, a data packet characteristic used as a match condition may include one or more specified packet attribute values. An action in a forwarding rule may specify any form of processing that can be performed on a data packet by a data forwarding element, such as specifying one or more ports of the data forwarding element via which the data packet is to be forwarded, specifying that the data packet is to be dropped, specifying that the data packet is to be processed by the controller, specifying modifications to be made to the data packet (e.g., rewriting header fields, adding new fields, etc.), etc. It should be appreciated, however, that forwarding configurations are not limited to forwarding rules, and other types of forwarding configurations for data forwarding elements may alternatively or additionally be derived, such as configurations for packet queues, scheduling parameters, etc.

In some embodiments, deriving the forwarding configuration(s) from the user-defined packet-processing policy may include static analysis of the user-defined packet-processing policy, such as by analyzing the user-defined packet-processing policy using a compiler configured to translate code from the general-purpose programming language of the user-defined packet-processing policy to the programming language of the data forwarding element forwarding rules.

Alternatively or additionally, in some embodiments dynamic (e.g., runtime) analysis (e.g., modeling) may be used to derive the forwarding configuration(s) from the user-defined packet-processing policy. For example, in some embodiments, deriving the forwarding configuration(s) may include applying the user-defined packet-processing policy at the controller to process a data packet through the data communications network. One or more characteristics of the data packet that are queried by the controller in applying the user-defined packet-processing policy to process the packet may be recorded, as well as the manner in which the data packet is processed by the user-defined packet-processing policy (e.g., the function outcome, which in some cases may be a path via which the data packet is routed through the data communications network). As discussed above, any suitable characteristics of the data packet may be queried under the policy and therefore recorded, such as one or more attribute values of the data packet that are read, one or more Boolean-valued attributes of the data packet that are tested, one or more network attributes such as network topology and/or host location attributes, etc. In some embodiments, this trace may allow a forwarding configuration to be defined to specify that data packets having the same characteristics that were queried in the first data packet are to be processed in the same manner.

In some embodiments, runtime analysis such as the tracing runtime may be complemented by and enhanced through static (i.e., compile-time) analysis, optimization and/or transformation. As an example, some embodiments may include a "useless packet access" elimination analysis. For example, consider the following algorithmic policy written in Java:

```
Route f(Packet p, Environment e) {
    int useless = p.ethType( );
    return nullRoute;
}
```

This program accesses the ethType field of the input packets, but unconditionally drops the packets (by sending them along the so-called "nullRoute"). This program is actually equivalent to the following program, which no longer accesses the ethType field:

```
Route f(Packet p, Environment e) {
    return nullRoute;
}
```

In some embodiments, a useless code data-flow analysis may be performed on the source code of the algorithmic policy, and may eliminate accesses such as the p.ethType( ) access in the aforementioned program. At compilation time, the program may be transformed to an intermediate representation, such as a Static Single Assignment (SSA) form. In some embodiments, a data-flow analysis may then proceed in two phases. First, the analysis may add each statement exiting the program to a "work list". The analysis may then repeatedly perform the following until the "work list" is empty: remove a statement from the "work list", mark it as "critical" and add any statements that define values used in the given statement (identifiable since the program is in SSA form) to the "work list". After this phase is over, eliminate any statements from the program that are not marked as "critical".

Various other static analyses are possible that could be used to enhance the runtime to improve the quality of the rules and/or other forwarding configurations generated by the runtime and/or to improve the speed (efficiency) of the runtime itself. Some static analysis may allow the user-defined policy program to be partially pre-compiled, for example by completely expanding some portion of the trace trees.

In other embodiments, static analysis may be employed without operation of the tracing runtime, for some or all user programs. For example, in some embodiments, the control system may perform a static analysis on the input program by constructing a control flow graph of the program, in which each statement of the program is a node in the graph and the graph includes a directed edge from one node to a second node if the statement for the first node can be followed by the statement for the second node. Define the predecessors of a node to be all the nodes reachable by traversing edges in the backwards direction starting from a node. In one exemplary embodiment, the static analysis may assign to each node the set of packet attributes accessed in executing the statement for the node. Furthermore, each node may be assigned the set of the union of the packet attributes in the statement of the node as well as the packet attributes accessed in all predecessors of the node. Finally, this exemplary static analysis may calculate the "accessed attribute set" for the overall program to be the union of the packet attributes accessed from each node representing a return statement from the function.

In some static analysis embodiments such as the embodiment described above, no tracing runtime may be performed during execution of the algorithmic policy. In some exemplary embodiments, a memo table which associates keys with routes may be constructed. After executing the program on a given packet and obtaining a given result, an entry may be added to the memo table. The entry may include a vector of values consisting of the values of each attribute in the accessed attribute set on the given packet, in association with the given return value from the execution. Forwarding configurations such as OpenFlow flow rules may then be constructed for the memo table matching on only the accessed attribute set and using only a single priority level. In the case when all control flow paths through the input program access the same set of packet attributes, this method may compute a memo table which is essentially identical to the trace tree which would be produced by the tracing runtime system for this program. However, omitting the tracing runtime may improve performance in some embodiments, by avoiding the runtime overhead associating with runtime tracing.

At act 2130 of method 2100, the derived forwarding configuration(s) may be applied to the appropriate data forwarding element(s) in the network, such as by sending a derived forwarding rule to its associated data forwarding element(s) for inclusion in the data forwarding element's set of forwarding rules. In some embodiments, priorities may be assigned to the derived forwarding rules or other forwarding configurations, such as by observing the order in which the controller queries different characteristics of data packets in applying the user-defined packet-processing policy, and assigning priorities based on that order (e.g., traversing a trace tree from root to leaf nodes, as discussed above, thereby following the order in which packet attributes are queried by the controller). In some embodiments, as discussed above, further optimization techniques may be applied, such as removing unnecessary forwarding configurations (e.g., rules), reducing the number of priority levels used, and/or invalidating stale forwarding configurations when a change of network state is identified from the network attributes queried.

In some embodiments, derived forwarding configurations may be applied to the corresponding data forwarding elements immediately as they are derived. However, this is not required, and derived forwarding configurations may be "pushed" to network elements at any suitable time and/or in response to any suitable triggering events, including as batch updates at any suitable time interval(s). In some embodiments, updates to network element forwarding configurations can be triggered by changes in system state (e.g. environment information such as network attributes) that invalidate previously cached forwarding configurations, such as forwarding rules. For example, if a switch port that was previously operational becomes non-operational (for example due to the removal of a network link, a network link failure, or an administrative change to the switch), any rules that forward packets to the given port may become invalid. Some embodiments may then immediately remove those rules, as well as removing any corresponding executions recorded in the trace tree(s) of the tracing runtime system. In some embodiments, other changes to network element forwarding configurations may be made in response to commands issued by the user-defined policy, such as via the user-defined state component described above.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs at least the above-discussed functions. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a data communications network comprising a plurality of data forwarding elements each having a set of forwarding configurations and being configured to forward data packets according to the set of forwarding configurations, the data communications network further comprising at least one controller including at least one processor configured to update forwarding configurations in at least some of the plurality of data forwarding elements, the at least one processor configured to perform a method comprising:

- accessing, at the at least one controller, a packet-processing policy defined by a user in a general-purpose programming language other than a programming language of data forwarding element forwarding rules, the packet-processing policy specifying how data packets are to be processed through the data communications network via the at least one controller;
- deriving, from the user-defined packet-processing policy, using the at least one processor of the at least one controller, a forwarding configuration for at least one data forwarding element of the plurality of data forwarding elements in the data communications network, wherein the deriving comprises:
  - applying the user-defined packet-processing policy at the at least one controller to process a first data packet through the data communications network;
  - recording one or more characteristics of the first data packet queried by the at least one controller in applying the user-defined packet-processing policy to process the first data packet, and a manner in which the first data packet is processed by the user-defined packet-processing policy; and
  - defining at least one forwarding configuration specifying that data packets having the one or more queried characteristics are to be processed in the manner in which the first data packet is processed; and
- applying the derived forwarding configuration to the at least one data forwarding element, wherein applying the derived forwarding configuration comprises communicating, by the at least one controller, the derived forwarding configuration to the at least one data forwarding element for inclusion in the at least one data forwarding element's set of forwarding configurations.

2. The method of claim 1, wherein deriving the forwarding configuration comprises deriving a forwarding rule specifying one or more characteristics of data packets to which the forwarding rule applies, and specifying how the at least one data forwarding element is to process data packets having the one or more specified characteristics.

3. The method of claim 2, wherein the one or more specified characteristics comprise one or more specified packet attribute values.

4. The method of claim 2 or 3, wherein specifying how the at least one data forwarding element is to process data packets having the one or more specified characteristics comprises specifying one or more ports of the at least one data forwarding element via which data packets having the one or more specified characteristics are to be forwarded, or specifying that data packets having the one or more specified characteristics are to be dropped, or specifying that data packets having the one or more specified characteristics are to be processed by the at least one controller.

5. The method of claim 1, wherein the deriving comprises analyzing the user-defined packet-processing policy at compilation time.

6. The method of claim 1, wherein the user-defined packet-processing policy is applied at the at least one controller to process the first data packet in response to arrival of the first data packet at a first data forwarding element of the plurality of data forwarding elements and the first data packet not being addressed by the first data forwarding element's set of forwarding configurations.

7. The method of claim 1, wherein recording the manner in which the first data packet is processed comprises recording a path via which the first data packet is routed through the data communications network, and wherein defining the at least one forwarding configuration comprises specifying that data packets having the one or more queried characteristics are to be routed via the recorded path.

8. The method of claim 1, wherein recording the one or more queried characteristics comprises recording one or more values of attributes of the first data packet read by the at least one controller in applying the user-defined packet-processing policy to process the first data packet.

9. The method of claim 1, wherein recording the one or more queried characteristics comprises recording one or more values of Boolean-valued attributes of the first data packet tested by the at least one controller in applying the user-defined packet-processing policy to process the first data packet.

10. The method of claim 6, wherein recording the one or more queried characteristics comprises recording one or more network topology and/or host location attributes of the first data packet's arrival.

11. The method of claim 10, further comprising:
- identifying a change of network state from the one or more recorded network topology and/or host location attributes; and
- invalidating one or more stale forwarding configurations based on the identified change of network state.

12. The method of claim 2, further comprising:
- observing an order in which the at least one controller queries different characteristics of data packets in applying the user-defined packet-processing policy to process the data packets; and
- assigning priorities to different forwarding rules based at least in part on the order in which the at least one controller queries the data packet characteristics corresponding to the different forwarding rules.

13. The method of claim 12, wherein assigning the priorities comprises minimizing a number of priority levels.

14. The method of claim 1, further comprising:
- deriving, from the user-defined packet-processing policy, using the at least one processor of the at least one controller, a plurality of forwarding configurations for the plurality of data forwarding elements in the data communication network; and
- analyzing the derived forwarding configurations to remove unnecessary forwarding configurations.

15. A network control system comprising:
- one or more interfaces to a plurality of data forwarding elements in a data communications network, each of the plurality of data forwarding elements having a set of forwarding configurations and being configured to forward data packets according to the set of forwarding configurations;
- at least one processor; and
- at least one storage medium storing processor-executable instructions that, when executed by the at least one processor, perform a method comprising:
  - accessing a packet-processing policy defined by a user in a general-purpose programming language other than a programming language of data forwarding element forwarding rules, the packet-processing policy specifying how data packets are to be processed through the data communications network;

deriving, from the user-defined packet-processing policy, a forwarding configuration for at least one data forwarding element of the plurality of data forwarding elements in the data communications network, wherein the deriving comprises:
  applying the user-defined packet-processing policy at the at least one controller to process a first data packet through the data communications network;
  recording one or more characteristics of the first data packet queried by the at least one controller in applying the user-defined packet-processing policy to process the first data packet, and a manner in which the first data packet is processed by the user-defined packet-processing policy; and
  defining at least one forwarding configuration specifying that data packets having the one or more queried characteristics are to be processed in the manner in which the first data packet is processed; and
applying the derived forwarding configuration to the at least one data forwarding element, wherein applying the derived forwarding configuration comprises communicating the derived forwarding configuration to the at least one data forwarding element for inclusion in the at least one data forwarding element's set of forwarding configurations.

16. At least one non-transitory processor-readable storage medium encoded with processor-executable instructions that, when executed by at least one processor of at least one controller in a data communication network comprising a plurality of data forwarding elements each having a set of forwarding configurations and being configured to forward data packets according to the set of forwarding configurations, cause the at least one processor to perform a method comprising:

accessing a packet-processing policy defined by a user in a general-purpose programming language other than a programming language of data forwarding element forwarding rules, the packet-processing policy specifying how data packets are to be processed through the data communications network via the at least one controller;
deriving, from the user-defined packet-processing policy, a forwarding configuration for at least one data forwarding element of the plurality of data forwarding elements in the data communications network, wherein the deriving comprises:
  applying the user-defined packet-processing policy at the at least one controller to process a first data packet through the data communications network;
  recording one or more characteristics of the first data packet queried by the at least one controller in applying the user-defined packet-processing policy to process the first data packet, and a manner in which the first data packet is processed by the user-defined packet-processing policy; and
  defining at least one forwarding configuration specifying that data packets having the one or more queried characteristics are to be processed in the manner in which the first data packet is processed; and
applying the derived forwarding configuration to the at least one data forwarding element, wherein applying the derived forwarding configuration comprises communicating the derived forwarding configuration to the at least one data forwarding element for inclusion in the at least one data forwarding element's set of forwarding configurations.

\* \* \* \* \*